US012651579B2

(12) United States Patent
Kobayashi et al.

(10) Patent No.: US 12,651,579 B2
(45) Date of Patent: Jun. 9, 2026

(54) DISPLAY DEVICE

(71) Applicant: Sharp Kabushiki Kaisha, Sakai City (JP)

(72) Inventors: Masamitsu Kobayashi, Sakai City (JP); Takafumi Miura, Sakai City (JP); Yasuyuki Togashi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/256,210

(22) Filed: Jul. 1, 2025

(65) Prior Publication Data

US 2026/0045234 A1 Feb. 12, 2026

(30) Foreign Application Priority Data

Aug. 9, 2024 (JP) ................................ 2024-134410

(51) Int. Cl.
*G09G 3/36* (2006.01)
*G09G 3/34* (2006.01)

(52) U.S. Cl.
CPC ......... *G09G 3/3607* (2013.01); *G09G 3/3406* (2013.01); *G09G 2320/0247* (2013.01); *G09G 2320/0271* (2013.01)

(58) Field of Classification Search
CPC ............... G09G 3/3607; G09G 3/3406; G09G 2320/0247; G09G 2320/0271
See application file for complete search history.

(56) References Cited

U.S. PATENT DOCUMENTS

| | | | | |
|---|---|---|---|---|
| 7,068,252 B2 * | 6/2006 | Hattori | H04N 13/324 | 348/E13.043 |
| 9,560,342 B2 * | 1/2017 | Cho | H04N 13/351 | |
| 11,113,997 B2 * | 9/2021 | Kim | G09G 3/003 | |
| 2006/0139234 A1 * | 6/2006 | Tanaka | H04N 13/31 | 345/9 |
| 2006/0262558 A1 * | 11/2006 | Cornelissen | G02B 30/24 | 362/613 |
| 2007/0018585 A1 * | 1/2007 | Ijzerman | H04N 13/351 | 348/E13.043 |
| 2007/0296865 A1 * | 12/2007 | Mino | G09G 3/3611 | 348/E5.096 |

(Continued)

FOREIGN PATENT DOCUMENTS

| | | | |
|---|---|---|---|
| CN | 110596919 A | * 12/2019 | G02F 1/1323 |
| CN | 111812894 A | * 10/2020 | G02F 1/134309 |

(Continued)

*Primary Examiner* — Dmitriy Bolotin
(74) *Attorney, Agent, or Firm* — Keating & Bennett, LLP

(57) ABSTRACT

A control unit of a display device that presents a first image to a first user located at a first position with respect to a display surface and presents a second image different from the first image to a second user located at a second position different from the first position alternately switches a first display mode and a second display mode. The control unit converts a gray scale value of the first image based on a light transmittance of the display panel achieved by repetition of a gray scale value of the first image and a gray scale value of black, (i) a light amount of first illumination light when observed from the first position, and (ii) a light amount of second illumination light as leakage light to the first position when observed from the first position.

10 Claims, 25 Drawing Sheets

(56) References Cited

U.S. PATENT DOCUMENTS

| | | | | |
|---|---|---|---|---|
| 2008/0088935 | A1* | 4/2008 | Daly | H04N 13/359 348/E13.043 |
| 2009/0140950 | A1* | 6/2009 | Woo | G09G 3/20 345/4 |
| 2009/0147178 | A1* | 6/2009 | Ahn | G09F 19/14 349/187 |
| 2015/0156480 | A1* | 6/2015 | Hamagishi | H04N 13/31 348/51 |
| 2015/0245015 | A1* | 8/2015 | Cho | H04N 13/354 348/59 |
| 2018/0278923 | A1* | 9/2018 | Fattal | G09G 3/3406 |

FOREIGN PATENT DOCUMENTS

| | | | | |
|---|---|---|---|---|
| WO | 2004088996 | A1 | 10/2004 | |
| WO | WO-2012144471 | A1 * | 10/2012 | G09G 3/003 |

* cited by examiner

| GRAY SCALE VALUE OF FIRST IMAGE BEFORE CONVERSION | GRAY SCALE VALUE OF FIRST IMAGE AFTER CONVERSION |
|---|---|
| 0 | 0 |
| ... | ... |
| 128 | 150 |
| ... | ... |
| 255 | 255 |

FIG. 22

DISPLAY DEVICE

CROSS-REFERENCE TO RELATED APPLICATIONS

This application claims the benefit of priority to Japanese Patent Application Number 2024-134410 filed on Aug. 9, 2024. The entire contents of the above-identified application are hereby incorporated by reference.

BACKGROUND

Technical Field

The disclosure described below relates to a display device.

A display device capable of presenting a plurality of individual images corresponding to a viewing direction of a user (viewer) on one display surface is called a multi-view display device. International Publication No. WO 2004/088996 described below discloses a configuration example of a multi-view display device.

SUMMARY

An object of an aspect of the disclosure is to improve display quality of a multi-view display device compared with the related art.

A display device according to an aspect of the disclosure is a display device configured to present a first image to a first user located at a first position with respect to a display surface and present a second image different from the first image to a second user located at a second position different from the first position, the display device including: a display panel including a first display pixel group that contributes to formation of the first image on the display surface and a second display pixel group that contributes to formation of the second image on the display surface; a backlight configured to emit illumination light toward the first display pixel group and the second display pixel group; a barrier configured to prevent part of first light, which is light obtained by wavelength conversion of the illumination light by the first display pixel group, and part of second light, which is light obtained by wavelength conversion of the illumination light by the second display pixel group, from traveling toward the display surface; and a control unit configured to control the display panel and the backlight, in which, in a first display mode, the control unit controls the display panel to minimize a light transmittance of the display panel at a position corresponding to the second display pixel group, and controls the backlight to stop emission of at least part of second illumination light that is the illumination light having directivity to the second position, in a second display mode different from the first display mode, the control unit controls the display panel to minimize a light transmittance of the display panel at a position corresponding to the first display pixel group, and controls the backlight to stop emission of at least part of first illumination light that is the illumination light having directivity to the first position, the control unit alternately switches between the first display mode and the second display mode, calls a period in which the first image is displayed in the first display mode as a first period, and calls a period in which the second image is displayed in the second display mode as a second period, and the control unit converts a gray scale value of the first image based on a light transmittance of the display panel achieved by repetition of a gray scale value of the first image and a gray scale value of black, (i) a light amount of the first illumination light when observed from the first position, and (ii) a light amount of the second illumination light as leakage light to the first position when observed from the first position.

According to the aspect of the disclosure, it is possible to improve the display quality in a multi-view display device as compared with the related art.

BRIEF DESCRIPTION OF DRAWINGS

The disclosure will be described with reference to the accompanying drawings, wherein like numbers reference like elements.

FIG. 22 shows an example of a first table.

DESCRIPTION OF EMBODIMENTS

Reference Embodiment

Figure 1:
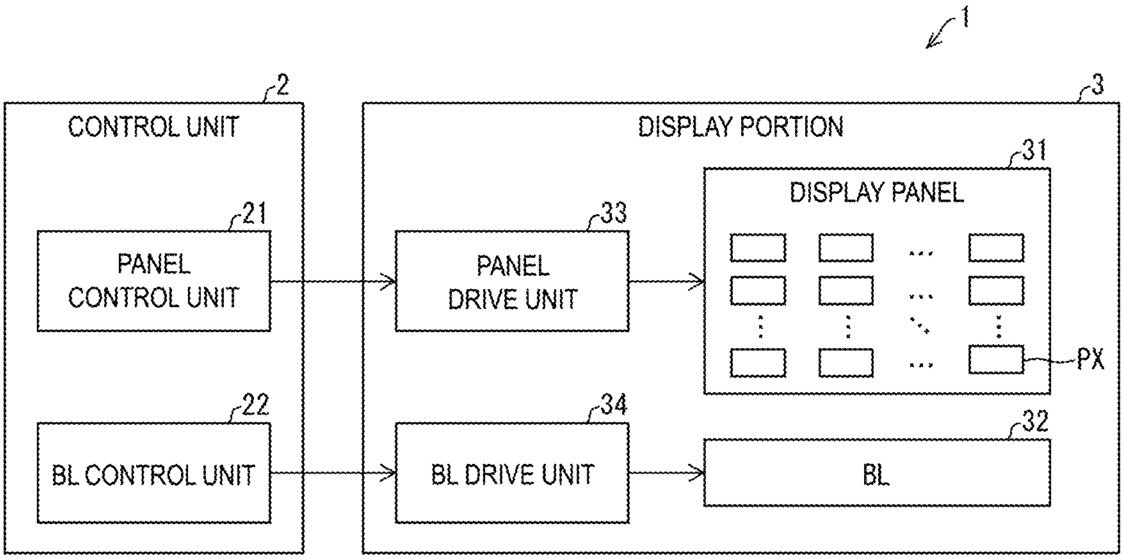
FIG. 1 is a block diagram illustrating a configuration example of a display device in a reference embodiment.

Prior to the description of a display device 1P of a first embodiment, a display device 1 as a reference embodiment will be described. For convenience of explanation, constituent elements (components) having the same function as the constituent elements described in the reference embodiment are denoted with the same reference numerals in each of the following embodiments, and descriptions thereof are not repeated. For the sake of simplification, descriptions of matters similar to known technology are also omitted as appropriate. Components and numerical values each described in this specification are merely examples unless there is a contradiction. Therefore, for example, unless there is a contradiction in particular, the positional relationship and the relation of connection between the components are not limited to the examples in each of the drawings.

FIG. 1 is a block diagram illustrating a configuration example of the display device 1. The display device 1 includes a control unit 2 and a display portion 3. The display device 1 may be a portable information terminal or a stationary display device. In this specification, "backlight" is abbreviated as "BL". In this specification, a case in which the display device 1 is a liquid crystal display device is exemplified.

The control unit 2 comprehensively controls each component of the display device 1. The control unit 2 in the reference embodiment functions as a display control device that controls display of the display portion 3. The control unit 2 includes a panel control unit 21 and a BL control unit 22. Therefore, the control unit 2 controls a display panel 31 and a BL 32 described below.

The panel control unit 21 generates liquid crystal data corresponding to an arbitrary input image. The liquid crystal data is data indicating a spatial distribution of liquid crystal transmittance (light transmittance of liquid crystal) in the display panel 31. The panel control unit 21 supplies the generated liquid crystal data to a panel drive unit 33 described below.

The BL control unit 22 generates BL data corresponding to the input image. The BL data is data indicating a spatial distribution of luminance in the BL 32. The BL control unit 22 supplies the generated BL data to a BL drive unit 34 described below.

The display portion 3 displays the input image in accordance with a command from the control unit 2. The display portion 3 in the first embodiment is a liquid crystal display. In the example of FIG. 1, the display portion 3 includes the display panel 31, the BL 32, the panel drive unit 33, and the BL drive unit 34.

The display panel 31 has a display region in which a plurality of display pixels PX are arranged. In this specification, a case in which the display panel 31 is a liquid crystal display panel is exemplified. The display panel 31 displays a predetermined image in accordance with a command from the control unit 2.

In this specification, for convenience of description, an XYZ orthogonal coordinate system shown in FIG. 2 or the like to be described later is used. An X direction and a Y direction correspond to a column direction and a row direction of the display panel 31, respectively. A Z direction is a normal direction of the display surface of the display panel 31. In this specification, it is assumed that a user of the display device 1 is located on the positive side in the Z direction. For this reason, the positive side in the Z direction is also referred to as a viewer side. On the other hand, the negative side in the Z direction is also referred to as a substrate side. The Z direction in this specification is also a thickness direction of the display device 1.

As is clear from the above description, an XY plane in this specification is a plane parallel to the display surface of the display panel 31. As illustrated in FIG. 1, the display panel 31 includes a plurality of display pixels PX regularly arranged in each of the X direction and the Y direction.

The BL 32 includes a light-emitting element (not illustrated) as a light source of the display portion 3. The BL 32 may include one or more light-emitting elements. By controlling the light emission of the light-emitting element, the spatial distribution of luminance in the BL 32 can be controlled. The BL 32 emits illumination light toward the display portion 3. In this specification, a case in which the light-emitting element is a white light-emitting diode (LED) is exemplified. Therefore, in this specification, a case in which the illumination light is white light is exemplified.

The panel drive unit 33 drives the display panel 31 in accordance with the liquid crystal data acquired from the panel control unit 21. Specifically, the panel drive unit 33 changes the light transmittance of each position of the display panel 31 in accordance with the liquid crystal data.

The BL drive unit 34 drives the BL 32 in accordance with the BL data acquired from the BL control unit 22. To be specific, the BL drive unit 34 controls lighting of the BL 32 in accordance with the BL data. To be more specific, the BL drive unit 34 controls the luminance of the light-emitting element in the BL 32 in accordance with the BL data.

As described above, the control unit 2 displays the input image on the display panel 31 by (i) driving the display panel 31 through the panel drive unit 33 and (ii) driving the BL 32 through the BL drive unit 34.

The display device 1 in the reference embodiment is a multi-view liquid crystal display device. For the sake of simplicity of description, in the reference embodiment, a case in which the display device 1 is a dual-view liquid crystal display device is exemplified. Therefore, the display device 1 is configured to present two individual images (dual-view display) in accordance with the viewing direction of the user.

One of the two individual images in the dual-view display is referred to herein as a first image and the other is referred to as a second image. The display device 1 in the reference embodiment is a configuration example of a known dual-view liquid crystal display device. In this specification, the second image is an image different from the first image.

Figure 2:
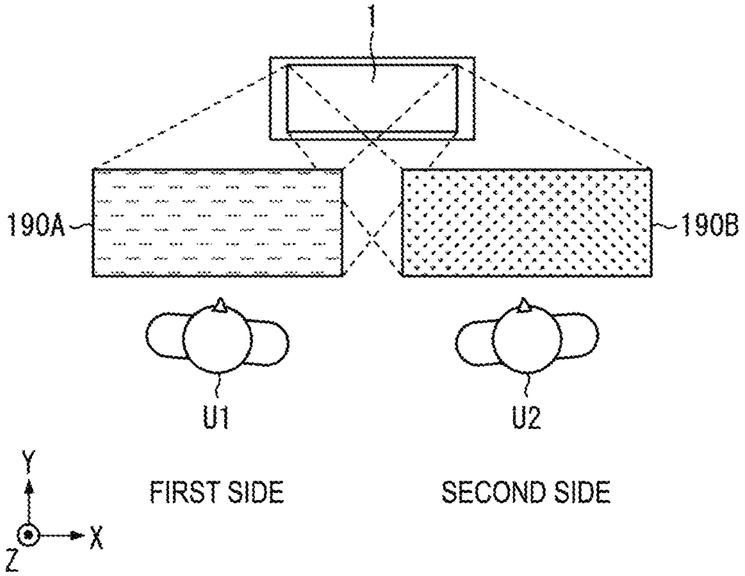
FIG. 2 schematically illustrates a dual-view display.

FIG. 2 schematically illustrates dual-view display in the display device 1. In FIG. 2, two users are exemplified as a viewer of an image displayed on the display device 1. In this specification, one of the two users is referred to as a first user U1, and the other is referred to as a second user U2.

In the example of FIG. 2, the side in the negative direction of the X direction is referred to as a first side, and the side in the positive direction of the X direction is referred to as a second side. That is, the second side is a side opposite to the first side in the X direction. The first side in the example of FIG. 2 is the left side in the paper plane. The first side may be referred to as an A side. On the other hand, the second side is the right side in the paper plane. The second side may be referred to as a B side.

In this specification, it is assumed that the first user U1 is located at a first position with respect to the display surface (not illustrated in FIG. 2) of the display device 1. On the other hand, it is assumed that the second user U2 is located at a second position with respect to the display surface. In this specification, the second position is a position different from the first position.

In the example of FIG. 2, the first user U1 is located on the first side with respect to the display surface, and the second user U2 is located on the second side with respect to the display surface. Therefore, in this specification, a case in which the second position is a position opposite to the first position is exemplified. In the example of FIG. 2, the first position is a position on the left side with respect to the display surface of the display device 1, and the second position is a position on the right side with respect to the display surface. A first image 190A in the example of FIG. 2 is an image presented to the first user U1. On the other hand, a second image 190B is an image presented to the second user U2.

Figure 3:
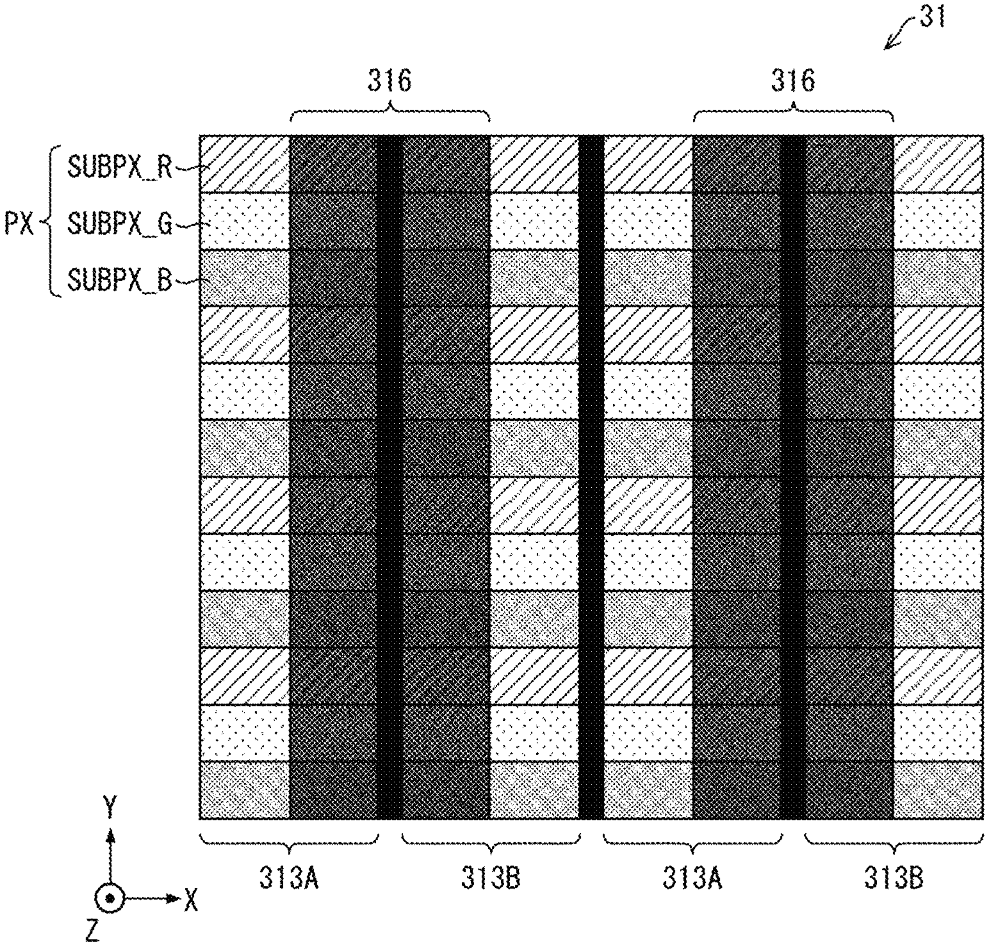
FIG. 3 is a schematic plan view illustrating a dual-view structure.

FIG. 3 is a schematic plan view illustrating a dual-view structure (a hardware configuration for achieving a dual-view display device). In the reference embodiment, a case in which the display panel 31 is an RGB (Red, Green, Blue) liquid crystal display panel is exemplified. In the example of FIG. 3, one display pixel PX is composed of one red sub-display pixel SUBPX R, one green sub-display pixel SUBPX G, and one blue sub-display pixel SUBPX B.

In the example of FIG. 3, the red sub-display pixel SUBPX R has a red color filter, the green sub-display pixel SUBPX G has a green color filter, and the blue sub-display pixel SUBPX B has a blue color filter.

Therefore, of the white light emitted from the BL 32, the white light incident on the red sub-display pixel SUBPX R is converted into red light. Of the white light emitted from the BL 32, the white light incident on the green sub-display pixel SUBPX G is converted into green light. Of the white light emitted from the BL 32, the white light incident on the blue sub-display pixel SUBPX B is converted into blue light. In the display panel 31, an image is displayed on the display surface by the red light, the green light, and the blue light emitted from the display pixels PX and traveling toward a viewing side.

As described above, the display device 1 is a dual-view liquid crystal display device. Therefore, the display panel 31 in the example of FIG. 3 includes a first display pixel group 313A and a second display pixel group 313B. The first display pixel group 313A is a group of display pixels PX that contribute to display of the first image. On the other hand, the second display pixel group 313B is a group of display pixels PX that contribute to display of the second image.

The first display pixel group 313A in the example of FIG. 3 is a group of display pixels PX having an odd column number. Therefore, for example, the display pixel PX located in the first column belongs to the first display pixel group 313A. The display pixel PX located in the third column also belongs to the first display pixel group 313A. On the other hand, the second display pixel group 313B in the example of FIG. 3 is a group of display pixels PX having an even column number. Therefore, for example, the display pixel PX located in the second column belongs to the second display pixel group 313B. The display pixel PX located in the fourth column also belongs to the second display pixel group 313B.

As described above, in the display panel 31, the first display pixel groups 313A and the second display pixel groups 313B are alternately positioned along the X direction. Thus, for example, when viewed along the direction from the first position toward the second position (e.g., the X direction), the first display pixel groups 313A and the second display pixel groups 313B can be alternately positioned in the display panel 31.

In addition, as illustrated in FIG. 3, the display panel 31 further includes a barrier 316. The barrier 316 may include any light absorbing material. The barrier 316 may be referred to as a parallax barrier. The barrier 316 may be referred to as a light blocking portion. When viewed from the display surface, the barrier 316 covers part of the first display pixel group 313A and part of the second display pixel group 313B (see also FIG. 4 described below). That is, the barrier 316 is located on the viewer side relative to the first display pixel group 313A and the second display pixel group 313B.

In this specification, light obtained by wavelength-converting illumination light emitted from the BL 32 by the first display pixel group 313A (e.g., color-converted light) is referred to as first light. On the other hand, light obtained by wavelength-converting illumination light emitted from the BL 32 by the second display pixel group 313B is referred to as second light. The barrier 316 prevents part of the first light from traveling toward a display surface (not illustrated in FIG. 3) of the display panel 31. The barrier 316 also prevents part of the second light from traveling toward the display surface.

Example of Dual View in Reference Embodiment

Figure 4:
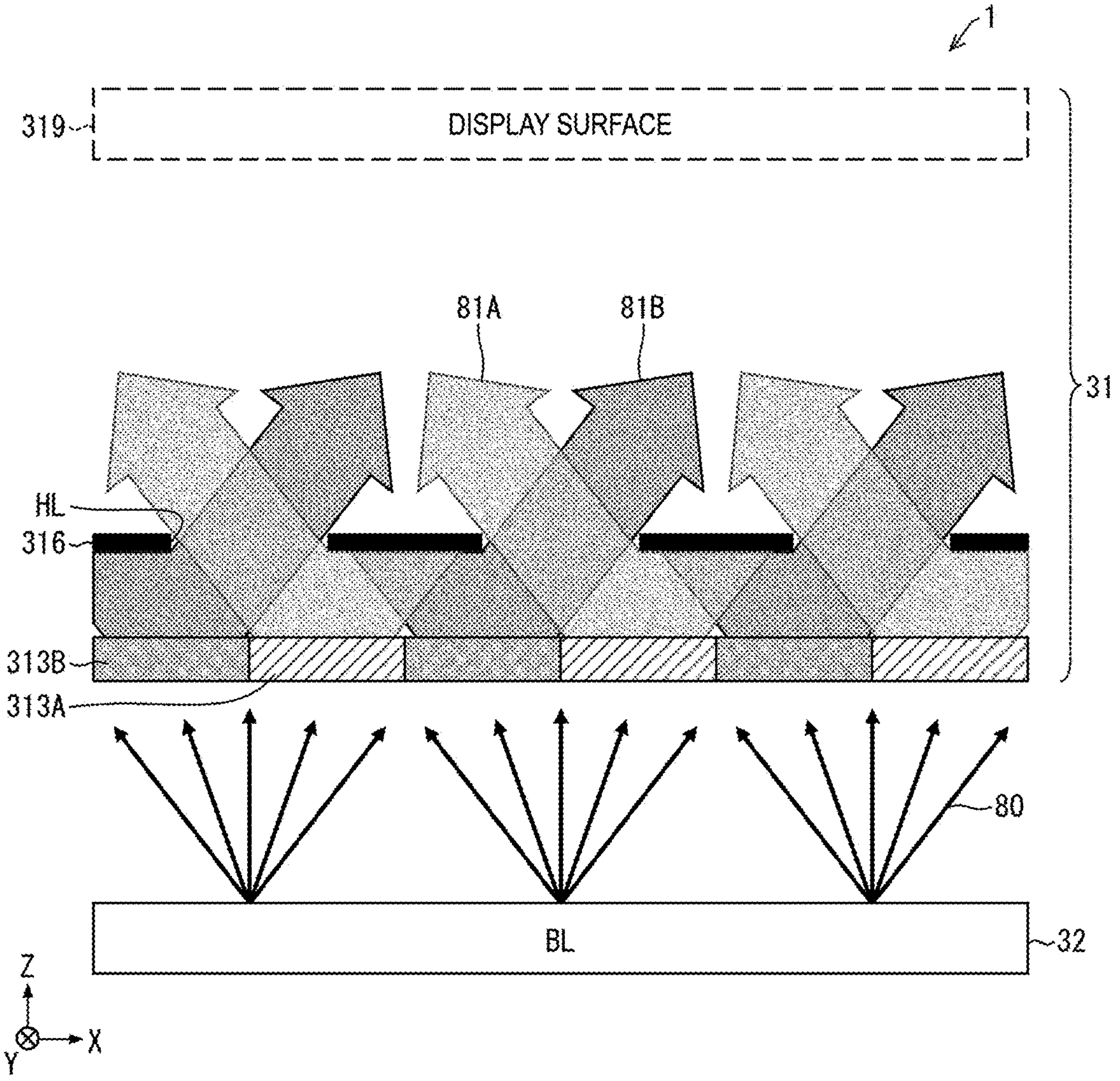
FIG. 4 is a diagram for explaining various light beams involved in a dual view in an ideal operation example of the reference embodiment.
Figure 5:
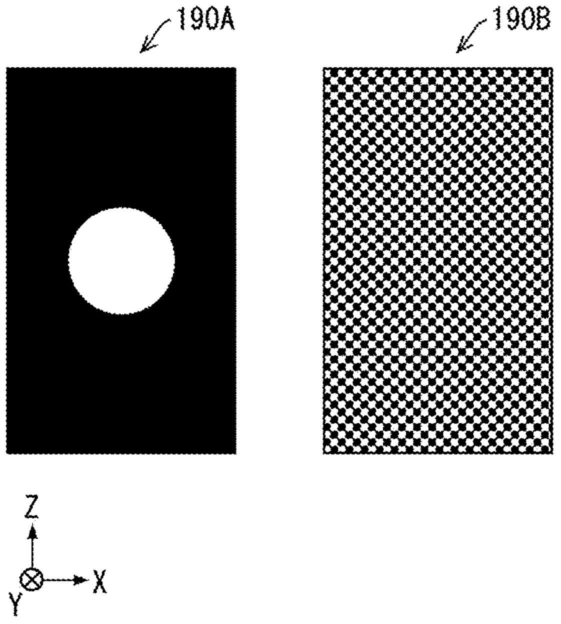
FIG. 5 illustrates an example of a first image and a second image displayed in the ideal operation example of the reference embodiment.

FIG. 4 and FIG. 5 each illustrate the ideal operation example of the dual view in the display device 1. FIG. 4 is a diagram for explaining various light beams involved in the dual view. As illustrated in FIG. 4, the display panel 31 is located on the viewer side relative to the BL 32. In FIG. 4, as components of the display panel 31, a display surface 319 is further illustrated in addition to the first display pixel group 313A, the second display pixel group 313B, and the barrier 316 described above.

As described above, the BL drive unit 34 drives the BL 32 in accordance with a command from the BL control unit 22. Therefore, as illustrated in FIG. 4, illumination light 80 is emitted from the BL 32 toward the first display pixel group 313A and the second display pixel group 313B. As illustrated in FIG. 4, it is assumed that the BL 32 in the reference embodiment does not have any particular light directivity.

At the same time, the panel drive unit 33 drives the display panel 31 in accordance with a command from the panel control unit 21. To be specific, the panel drive unit 33 drives the first display pixel group 313A and the second display pixel group 313B in accordance with a command from the panel control unit 21. In the example of FIG. 4, the panel control unit 21 drives each of the first display pixel group 313A and the second display pixel group 313B through control of the panel drive unit 33 so that the first image and the second image are displayed on the display panel 31.

In the ideal operation example, a light absorption rate of the barrier 316 is assumed to be 100%. Therefore, as illustrated in FIG. 4, an opening HL through which part of the first light and part of the second light described above pass is formed in the barrier 316. When viewed from the display surface, the opening HL is located so as to expose part of each of the first display pixel group 313A and the second display pixel group 313B.

Therefore, part of the first light having directivity to the first side passes through the opening HL and travels toward the display surface 319. Light 81A in FIG. 4 is an example of the first light having directivity to the first position, which passes through the opening HL and travels toward the display surface 319. The light 81A has, for example, directivity to the first side. The light 81A contributes to formation of the first image on the display surface 319.

On the other hand, part of the second light having directivity to the second position passes through the opening HL and travels toward the display surface 319. Light 81B in FIG. 4 is an example of the second light having directivity to the second side, which passes through the opening HL and travels toward the display surface 319. The light 81B has, for example, directivity to the second side. The light 81B contributes to formation of the second image on the display surface 319.

FIG. 5 illustrates an example of the first image and the second image displayed in the ideal operation example of the display device 1. FIG. 5 corresponds to the example of FIG. 4 described above. The first image 190A in FIG. 5 is an image showing a black background and a white circle located at the center. The second image 190B in FIG. 5 is an image showing a black and white checkered pattern.

Since the example of FIG. 5 is an ideal example, crosstalk does not occur between the first image 190A and the second image 190B. The crosstalk in this specification refers to a phenomenon in which one display image is mixed with another display image in multi-view display. In the following description of the reference embodiment, as an example of crosstalk, a case in which one display image is mixed with the other display image in dual-view display will be described.

Figure 6:
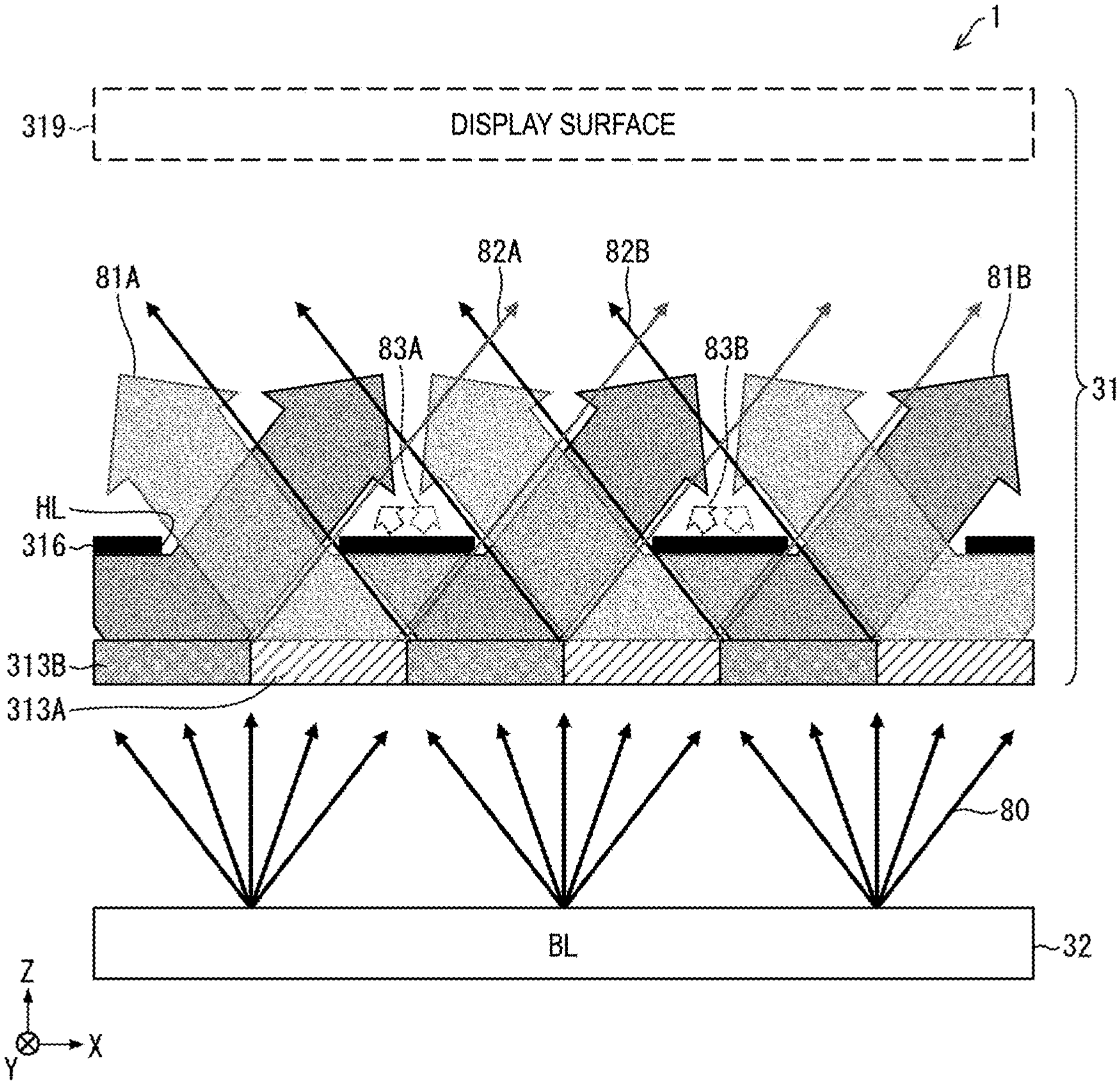
FIG. 6 is a diagram for explaining various light beams involved in a dual view in an actual operation example of the reference embodiment.
Figure 7:
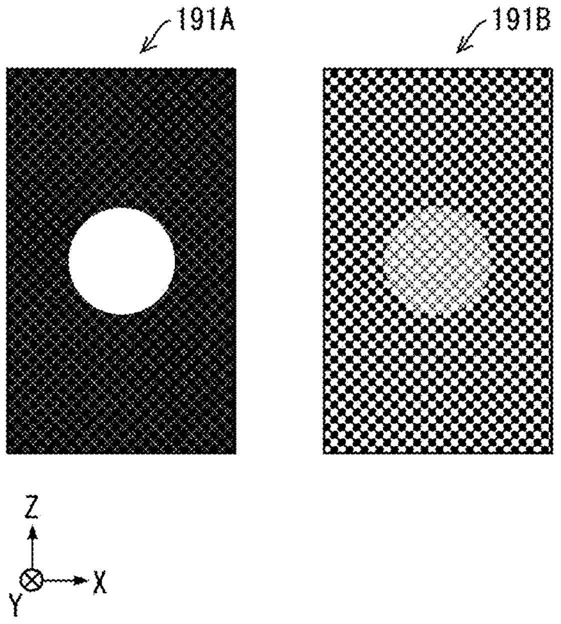
FIG. 7 illustrates an example of a first image and a second image displayed in the actual operation example of the reference embodiment.

FIG. 6 and FIG. 7 each illustrate an actual operation example of the dual view in the display device 1. FIG. 6 and FIG. 7 are paired up with FIG. 4 and FIG. 5, respectively. Reference will now be made FIG. 6. In the actual operation example, unlike the example of FIG. 4 described above, the light having the directivity to the second position in the first light is not completely blocked by the barrier 316. For example, in the actual operation example, part of the first light passes through the opening HL and travels toward the display surface 319. Light 82A in FIG. 6 is an example of the first light having directivity to the second position, which passes through the opening HL and travels toward the display surface 319.

Similarly, in the actual operation example, the light having the directivity to the first position in the second light is not completely blocked by the barrier 316. For example, in the actual operation example, part of the second light passes through the opening HL and travels toward the display surface 319. Light 82B in FIG. 6 is an example of the second light having directivity to the first position, which passes through the opening HL and travels toward the display surface 319.

In addition, the light absorption rate of the actual barrier 316 is less than 100%. Therefore, in the actual operation example, part of the first light is transmitted through a portion of the barrier 316 overlapping the first display pixel group 313A and the second display pixel group 313B, and travels toward the display surface 319. Similarly, part of the second light is transmitted through the portion and travels toward the display surface 319. Light 83A in FIG. 6 is an example of the first light having directivity to the second position, which passes through the portion and travels toward the display surface 319. Light 83B is an example of the second light having directivity to the first position, which passes through the portion and travels toward the display surface 319.

FIG. 7 illustrates an example of the first image and the second image displayed in the actual operation example of the display device 1. As described above with reference to FIG. 6, in the actual operation example, part of the first light goes around to the second position. Therefore, a second image 191B in the example of FIG. 7 is an image in which the first image 190A is mixed in with the second image 190B in the example of FIG. 5. The mixing of the first image 190A with the second image 190B is caused by the light 82A and the light 83A in the example of FIG. 6. Thus, the light 82A and the light 83A are each the first light that is undesirable in the dual-view display.

Similarly, in the actual operation example, part of the second light goes around to the first position. Therefore, a first image 191A in the example of FIG. 7 is an image in which the second image 190B is mixed in with the first image 190A in the example of FIG. 5. The mixing of the second image 190B with the first image 190A is caused by the light 82B and the light 83B in the example of FIG. 6. Thus, the light 82B and the light 83B are each the second light that is not desirable in the dual-view display.

First Embodiment

As described above, in the related art (e.g., display device 1), the display quality of the first image and the second image in the dual-view display may be degraded. In order to solve the problem in the related art, the inventors of the present application (hereinafter, simply referred to as "inventors") newly created the display device 1P of the first embodiment as a display device different from the related art.

Figure 8:
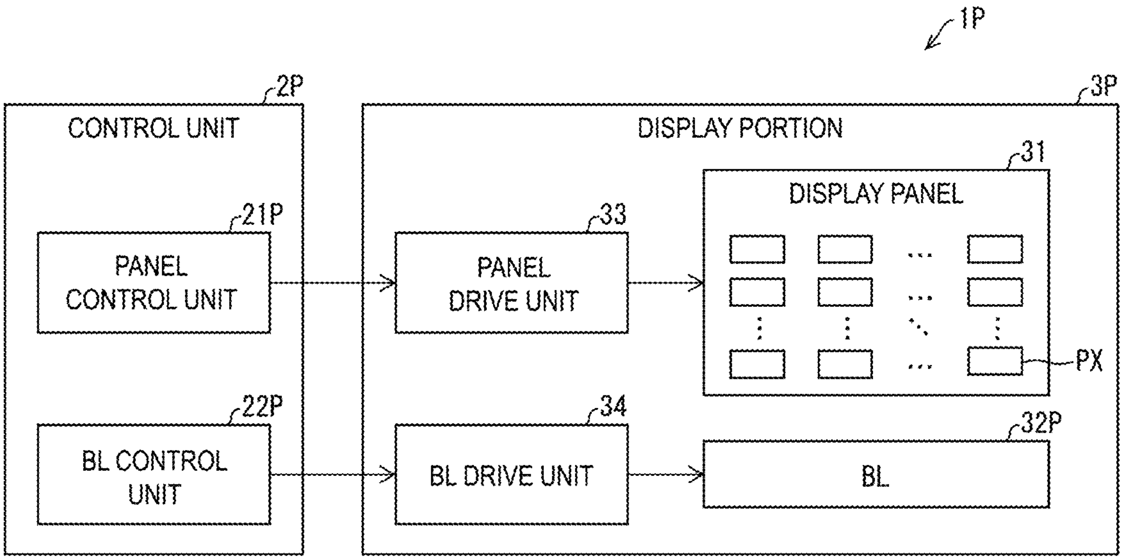
FIG. 8 is a block diagram illustrating a configuration example of a display device in a first embodiment.

FIG. 8 is a block diagram illustrating a configuration example of the display device 1P. FIG. 8 is a diagram paired up with FIG. 1. The display device 1P includes a control unit 2P and a display portion 3P. The control unit 2P includes a panel control unit 21P and a BL control unit 22P. The display portion 3P includes a BL 32P instead of the BL 32.

Example of Dual View in First Embodiment

Figure 9:
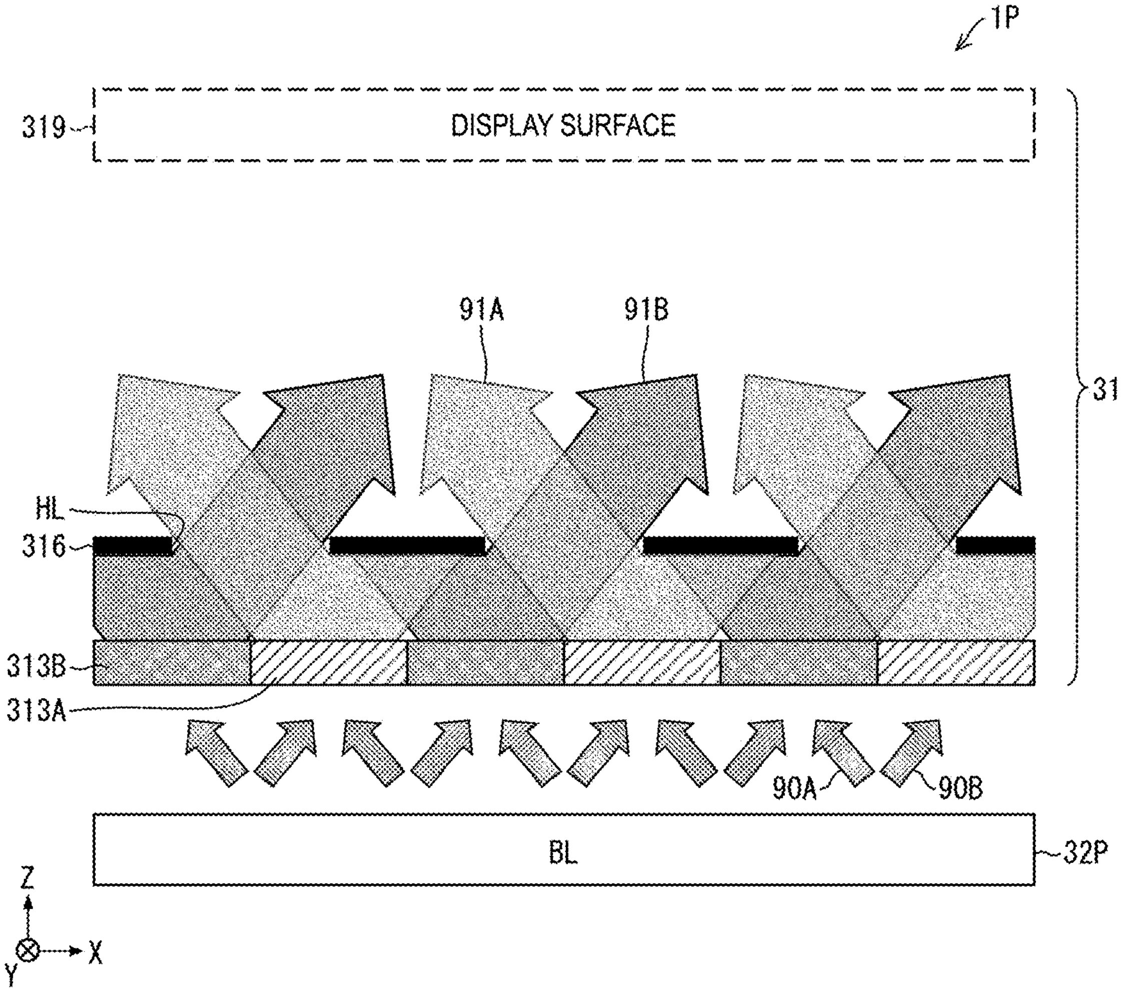
FIG. 9 is a diagram for explaining various light beams involved in a dual view in the first embodiment.

FIG. 9 is a diagram for explaining various light beams involved in the dual view in the display device 1P. FIG. 9 illustrates a virtual display mode in which the first light is emitted from the first display pixel group 313A and the second light is emitted from the second display pixel group 313B in a certain period in consideration of the correspondence with FIG. 5 described above. Therefore, it should be noted that the display mode in the example of FIG. 9 is different from a first display mode and a second display mode described below.

As illustrated in FIG. 9, the BL 32P has higher light directivity in a predetermined direction (e.g., the X direction) than the BL 32. In this specification, illumination light having directivity to the first position is referred to as first illumination light. On the other hand, illumination light having directivity to the second position is referred to as second illumination light. In FIG. 9, a first illumination light 90A and a second illumination light 90B are illustrated. As an example, the first illumination light 90A has directivity to the first side, and the second illumination light 90B has directivity to the second side.

Light 91A in FIG. 9 is an example of the first light having directivity to the first position, which passes through the opening HL and travels toward the display surface 319. The light 91A is derived from the first illumination light 90A. Therefore, the light 91A has higher directivity to the first position than the above-described light 81A. As an example, the light 91A has higher directivity to the first side than the above-described light 81A.

Light 91B in FIG. 9 is an example of the second light having directivity to the second position, which passes through the opening HL and travels toward the display surface 319. The light 91B is derived from the second illumination light 90B. The light 91B has higher directivity to the second side than the above-described light 81B. As an example, the light 91B has higher directivity to the second side than the above-described light 81B.

As described above, for example, by using the BL 32P having high light directivity in the X direction, crosstalk can be reduced as compared with the related art. The BL 32P may be a BL having any light guiding mechanism. Examples of the light guiding mechanism include a prism-shaped light guide, a viewing angle control film, and a louver. According to these light guiding mechanisms, the first illumination light 90A and the second illumination light 90B can be generated.

In addition, the display device 1P adopts a display control method different from the related art in order to further reduce the crosstalk. To be specific, the control unit 2P switches a light emission state of the display portion 3P between (i) a first period in which the first image is displayed on the display portion 3P and (ii) a second period in which the second image is displayed on the display portion 3P. In the first embodiment, the first period and the second period are separate periods. That is, in the first embodiment, unlike the reference embodiment, the first image and the second image are displayed in a time-division manner.

Figure 10:
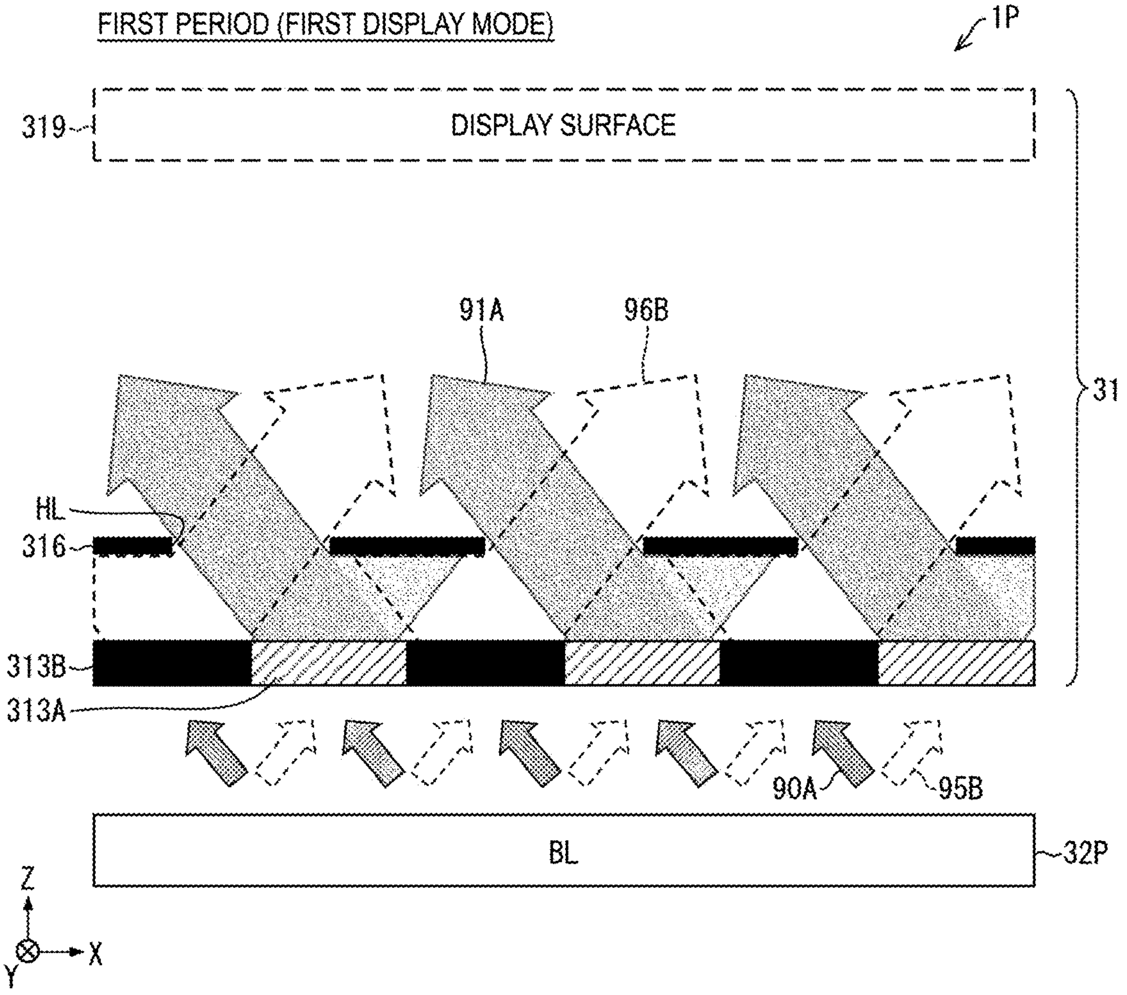
FIG. 10 is a diagram for explaining an operation example in a first period.
Figure 11:
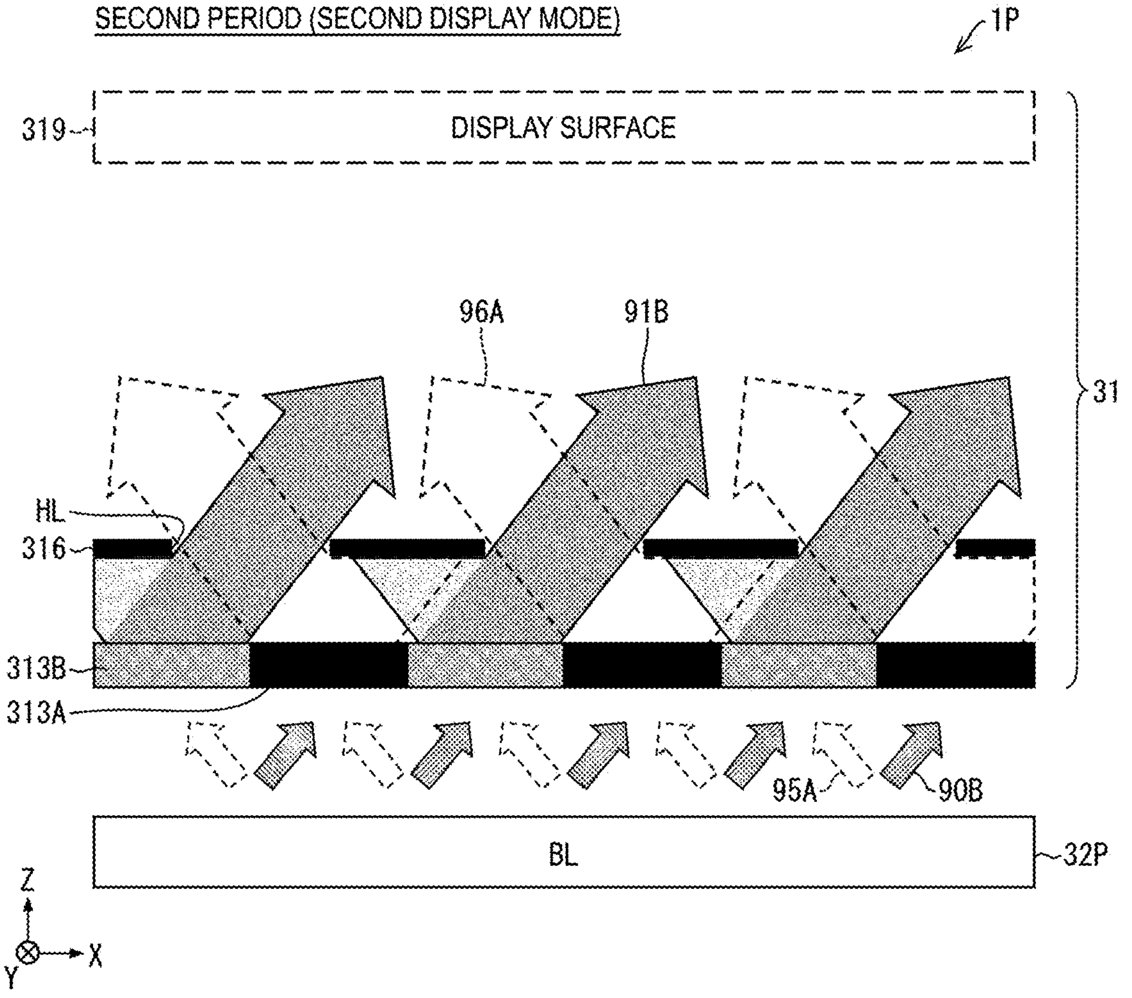
FIG. 11 is a diagram for explaining an operation example in a second period.

FIG. 10 and FIG. 11 each illustrate an operation example of dual view in the display device 1P. FIG. 10 and FIG. 11 are diagrams each paired with FIG. 9 described above. Reference will now be made to FIG. 10. FIG. 10 is a diagram for explaining an operation example in the first period.

The control unit 2P drives the display portion 3P in the first display mode in the first period. The first display mode is a mode intended to display only the first image on the display portion 3P in the first period.

To be specific, in the first display mode, the BL control unit 22P controls the BL drive unit 34 to cause the BL 32P to emit only the first illumination light 90A. In other words, in the first display mode, the BL control unit 22P controls the BL drive unit 34 to cause the BL 32P to stop the emission of the second illumination light 90B. Therefore, in the first display mode, the second illumination light 90B is not emitted from the BL 32P (see reference numeral 95B in FIG. 10).

In addition, in the first display mode, the panel control unit 21P controls the panel drive unit 33 to cause the display panel 31 to display the first image only at a position corresponding to the first display pixel group 313A. In other words, in the first display mode, the panel control unit 21P controls the panel drive unit 33 to cause the display panel 31 to perform black display at a position corresponding to the second display pixel group 313B.

To be specific, in the first display mode, the panel control unit 21P controls the panel drive unit 33 so as to minimize the light transmittance of the display panel 31 at the position corresponding to the second display pixel group 313B. The minimum value of the light transmittance herein is ideally 0.

By driving the BL 32P and the display panel 31 as described above, in the first display mode, unlike the second display mode described below, the light 91B is not emitted from the second display pixel group 313B (see reference numeral 96B in FIG. 10).

For this reason, in the first display mode, the leakage of the second light from the second display pixel group 313B to the first position is significantly reduced as compared with the related art. Therefore, in the first display mode, the degree of mixing of the second image with the first image is significantly reduced as compared with the related art. Ideally, in the first display mode of the display device 1P, only the first light having the directivity to the first position passes through the opening HL and travels toward the display surface 319 (see the light 91A in FIG. 10).

Next, reference will be made to FIG. 11. FIG. 11 is a diagram for explaining an operation example in the second period. The control unit 2P drives the display portion 3P in the second display mode in the second period. The second display mode is a mode intended to display only the second image on the display portion 3P in the second period. Thus, the second display mode is a display mode different from the first display mode.

To be specific, in the second display mode, the BL control unit 22P controls the BL drive unit 34 to cause the BL 32P to emit only the second illumination light 90B. In other words, in the second display mode, the BL control unit 22P controls the BL drive unit 34 to cause the BL 32P to stop the emission of the first illumination light 90A. Therefore, in the second display mode, the first illumination light 90A is not emitted from the BL 32P (see reference numeral 95A in FIG. 11).

In addition, in the second display mode, the panel control unit 21P controls the panel drive unit 33 to cause the display panel 31 to display the second image only at a position corresponding to the second display pixel group 313B. In other words, in the second display mode, the panel control unit 21P controls the panel drive unit 33 to cause the display panel 31 to perform black display at a position corresponding to the first display pixel group 313A.

To be specific, in the second display mode, the panel control unit 21P controls the panel drive unit 33 so as to minimize the light transmittance of the display panel 31 at the position corresponding to the first display pixel group 313A.

By driving the BL 32P and the display panel 31 as described above, in the second display mode, unlike the above-described first display mode, the light 91A is not emitted from the first display pixel group 313A (see reference numeral 96A in FIG. 11).

For this reason, in the second display mode, the leakage of the first light from the first display pixel group 313A to the second position is significantly reduced as compared with the related art. Therefore, in the second display mode, the degree of mixing of the first image with the second image is significantly reduced as compared with the related art. Ideally, in the second display mode of the display device 1P, only the second light having the directivity to the second position passes through the opening HL and travels toward the display surface 319 (see the light 91B in FIG. 11).

Figure 12:
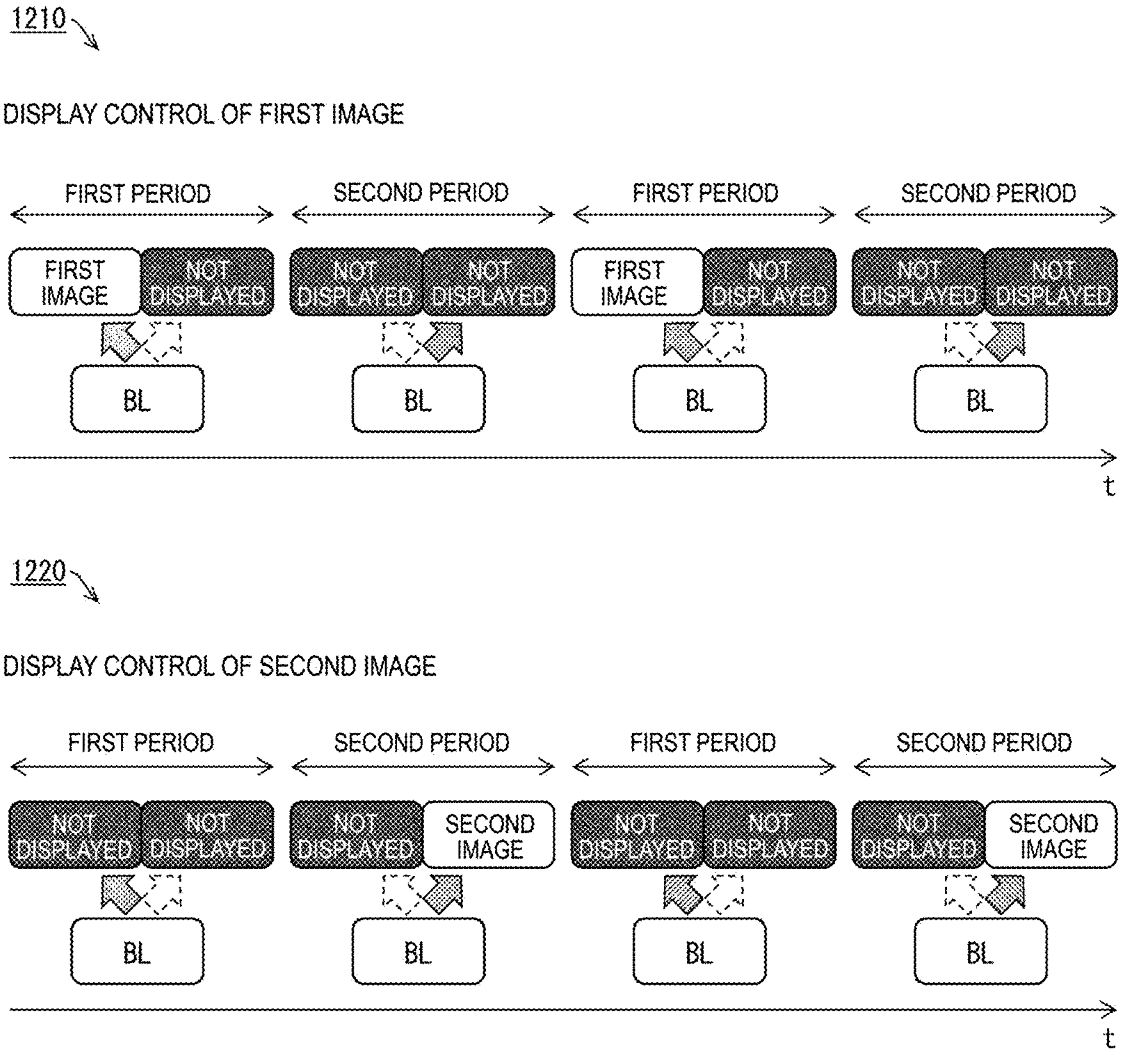
FIG. 12 schematically illustrates a time series of display control of the first image and the second image in the first period and the second period.

FIG. 12 schematically illustrates a time series of display control of the first image and the second image in the first period and the second period. In FIG. 12, a reference numeral 1210 denotes a time series of display control of the first image, and a reference numeral 1220 denotes a time series of display control of the second image. In FIG. 12, t represents time on a time axis. In this specification, a case in which the time length of the first period is equal to the time length of the second period is exemplified.

In the example of FIG. 12, for convenience of description, a case in which the panel drive unit 33 includes two individual drivers is illustrated. It is assumed that the panel drive unit 33 in the example of FIG. 12 includes a first driver which is a dedicated driver for display control of the first image and a second driver which is a dedicated driver for display control of the second image. In this example, the first driver is not involved in driving a portion of the display panel 31 corresponding to the second display pixel group 313B. Similarly, the second driver is not involved in driving a portion of the display panel 31 corresponding to the first display pixel group 313A.

First, an example of the reference numeral 1210 will be described. The example of the reference numeral 1210 corresponds to the operation example of the first driver. As described above, in the first period, the BL 32P emits only the first illumination light 90A under the control of the BL control unit 22P. In the first period, the first driver drives only a portion of the display panel 31 corresponding to the first display pixel group 313A so that only the first image is displayed on the display panel 31. As a result, in the first period, only the first image can be presented to the first user U1 located at the first position with respect to the display panel 31 (e.g., the first user U1 located on the first side with respect to the display panel 31).

On the other hand, in the example of the reference numeral 1210, in the second period, the first driver causes a portion of the display panel 31 corresponding to the first display pixel group 313A to perform black display. Therefore, in the second period, the first driver does not drive any part of the display panel 31.

Next, an example of the reference numeral 1220 will be described. The example of the reference numeral 1220 corresponds to the operation example of the second driver. As described above, in the second period, the BL 32P emits only the second illumination light 90B under the control of the BL control unit 22P. In the second period, the second driver drives only a portion of the display panel 31 corresponding to the second display pixel group 313B so that only the second image is displayed on the display panel 31. As a result, in the second period, only the second image can be presented to the second user U2 located at the second position with respect to the display panel 31 (e.g., the second user U2 located on the second side with respect to the display panel 31).

On the other hand, in the example denoted by the reference numeral 1220, in the first period, the second driver causes a portion of the display panel 31 corresponding to the second display pixel group 313B to perform black display. Therefore, in the first period, the second driver does not drive any part of the display panel 31.

As illustrated in FIG. 12, in the first embodiment, the first period and the second period are alternately repeated. Therefore, the control unit 2P controls the display portion 3P to thereby alternately switch between the first display mode and the second display mode. As an example, the control unit 2P may switch between the first display mode and the second display mode at a predetermined frequency.

The control unit 2P preferably switches between the first display mode and the second display mode at a frequency equal to or higher than 120 Hz. By switching between the first display mode and the second display mode at the frequency equal to or higher than 120 Hz, flickers that may occur when switching between the first display mode and the second display mode are less likely to be visually recognized by the user. Therefore, the display quality of the dual-view display in the first embodiment can be further improved.

More preferably, the control unit 2P switches between the first display mode and the second display mode at a frequency equal to or higher than 180 Hz. In this case, the display quality of the dual-view display can be further improved.

Example of Quantitative Evaluation Result

In order to demonstrate the effect of the display device 1P, the inventors performed various quantitative evaluations on each of the display device 1 and the display device 1P. As an example, a case in which the first image is a white display image (an image showing only a white background) and the second image is a black display image (an image showing only a black background) will be considered. In this case, the luminance of the second image can be increased by mixing the first image in with the second image at the time of dual-view display.

Therefore, for example, an index value indicating the degree of crosstalk (hereinafter, referred to as a "crosstalk index value") can be determined based on the amount of increase in the luminance of the display panel when the display state is changed from a predetermined display state to another display state. In the following description, crosstalk is also referred to as XT.

In this example, regarding the display state of the liquid crystal panel, white display is represented by W, and black display is represented by K. In this example, a state in which white display is performed on the first side and black display is performed on the second side is represented as "AWBK". The same notation may also be used as a character representing the luminance of the display panel in the same state.

On the other hand, a state in which black display is performed on the first side and white display is performed on the second side is represented as "AKBW". The same notation may also be used as a character representing the luminance of the display panel in the same state.

A state in which black display is performed on the first side and black display is performed on the second side is represented as "AKBK". The same notation may also be used as a character representing the luminance of the display panel in the same state.

On the other hand, a state in which white display is performed on the first side and white display is performed on the second side is represented as "AWBW". The same notation may also be used as a character representing the luminance of the display panel in the same state.

In addition, in this example, a notation is introduced to represent a light emission state of the BL. The notation "_A" indicates that a state in which light is emitted only to the first display pixel group is maintained. The notation "_B" indicates that a state in which light is emitted only to the second display pixel group is maintained. On the other hand, the notation "_AB" indicates that a state in which light is emitted to both the first display pixel group and the second display pixel group is maintained. This state corresponds to the operation example in the reference embodiment.

As described in the first embodiment, the notation "_S" indicates that control for switching the light emission state of the BL is performed. In addition, the notation "_N" represents a general BL having no particular light directivity. In this example, in a case other than "_N", it is assumed that the BL has the light directivity described in the first embodiment.

As described above, in the example of the first embodiment, the first display mode and the second display mode are switched at a predetermined frequency. The length of the first period is set to be equal to the length of the second period. Based on this, in this example, each luminance in the case of "_S" is determined as follows:

$$AWBK\_S=(AWBK\_A+AKBW\_B)/2 \quad (1\text{-}1)$$

$$AKBW\_S=(AKBW\_B+AKBK\_A)/2 \quad (1\text{-}2)$$

$$AKBK\_S=(AKBK\_A+AKBK\_B)/2 \quad (1\text{-}3)$$

$$AWBW\_S=(AWBW\_A+AWBW\_B)/2 \quad (1\text{-}4).$$

Figure 13:
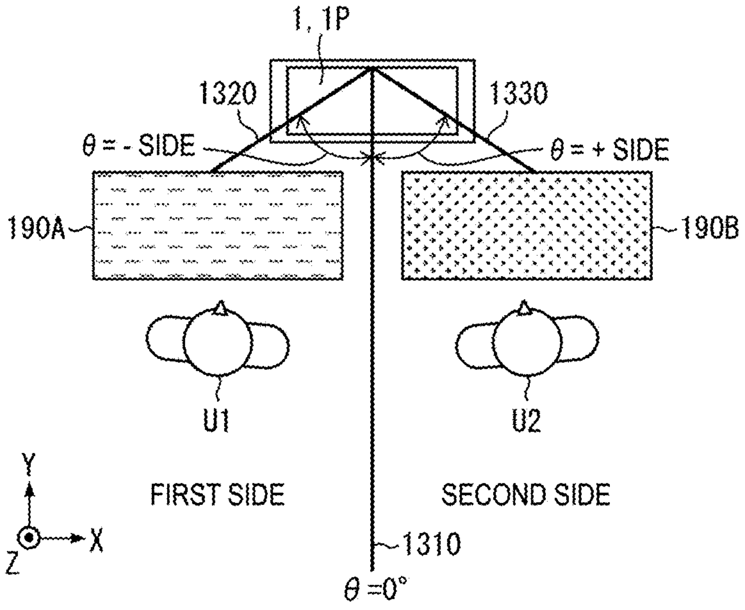
FIG. 13 is a diagram explaining an angle θ as an explanatory variable.

FIG. 13 is a diagram explaining an angle θ as an explanatory variable in this example. θ represents an inclination angle in the X direction with respect to the Y axis. θ is a parameter corresponding to a line-of-sight direction of a user when the user is viewing the display surface. As illustrated in FIG. 13, in this specification, it is assumed that θ=0° when the optical axis of interest is parallel to the Y axis. Therefore, when an optical axis of interest is an optical axis 1310 in FIG. 13, θ=0°.

In this specification, it is assumed that θ=−90° when the direction of the optical axis of interest coincides with the negative direction of the X direction. Therefore, when the optical axis of interest is an optical axis 1320 in FIG. 13, θ<0°. The first user U1 in the example of FIG. 13 is located on the side where θ is negative. In FIG. 13, the side where θ is negative is expressed as "θ=−side". "θ=−side" in FIG. 13 corresponds to the first side.

On the other hand, it is assumed that θ=90° when the direction of the optical axis of interest coincides with the positive direction of the X direction. Therefore, when the optical axis of interest is an optical axis 1330 in FIG. 13, θ>0°. The second user U2 in the example of FIG. 13 is located on the side where θ is positive. In FIG. 13, the side where θ is positive is expressed as "θ=+side". The "θ=+side" in FIG. 13 corresponds to the second side.

Figure 14:
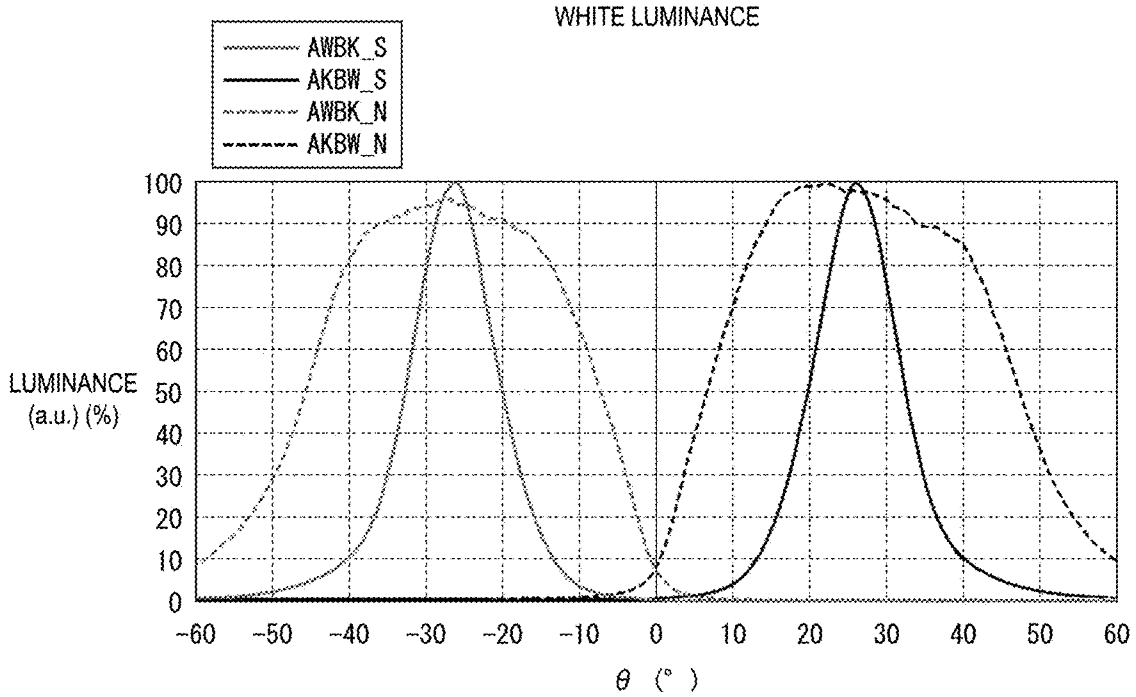
FIG. 14 shows examples of white luminance in the reference embodiment and the first embodiment.

FIG. 14 shows examples of white luminance (luminance when a white display image is displayed) in the reference embodiment and the first embodiment. In the graph of FIG. 14, the horizontal axis represents θ and the vertical axis represents luminance. The unit of the horizontal axis is "°", and the unit of the vertical axis is an arbitrary unit.

As shown in FIG. 14, in the case of "_S", the peak waveform of the white luminance is sharper than in the case of "_N". This indicates that light leakage at the time of dual-view display can be effectively reduced by the method of the first embodiment as compared with the related art.

Figure 15:
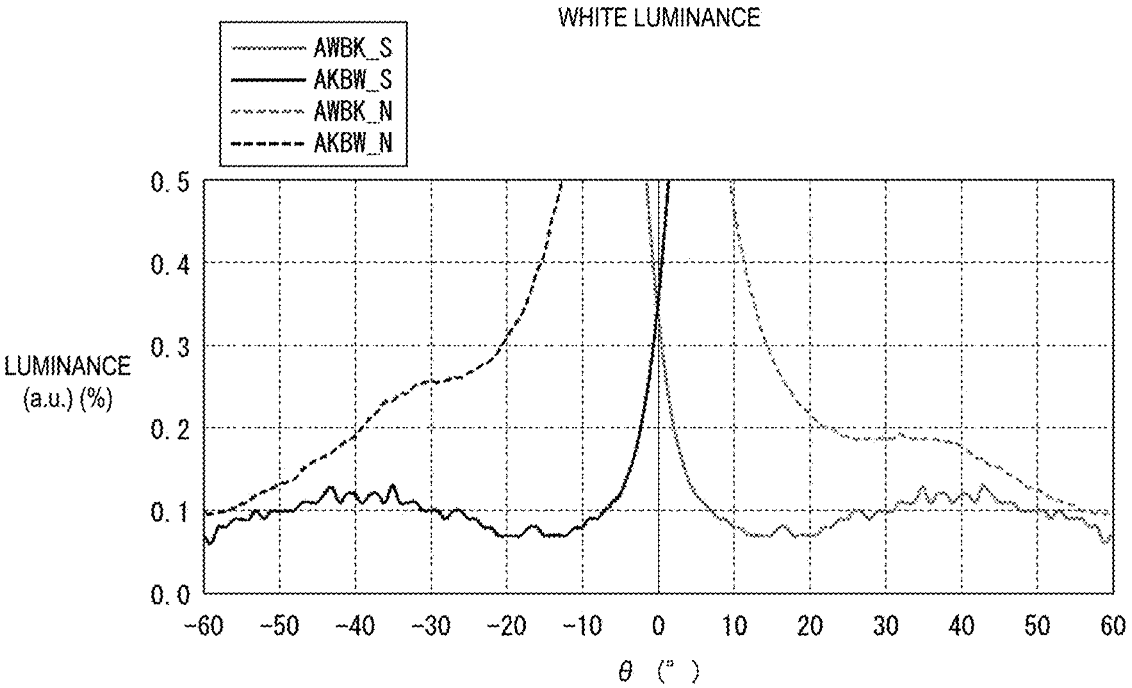
FIG. 15 is a graph showing part of the graph of FIG. 14 in an enlarged manner.

FIG. 15 is a graph showing part of the graph of FIG. 14 in an enlarged manner. Specifically, FIG. 15 is a graph obtained by enlarging the graph of FIG. 14 at a position where the value of the vertical axis is near 0.

Figure 16:
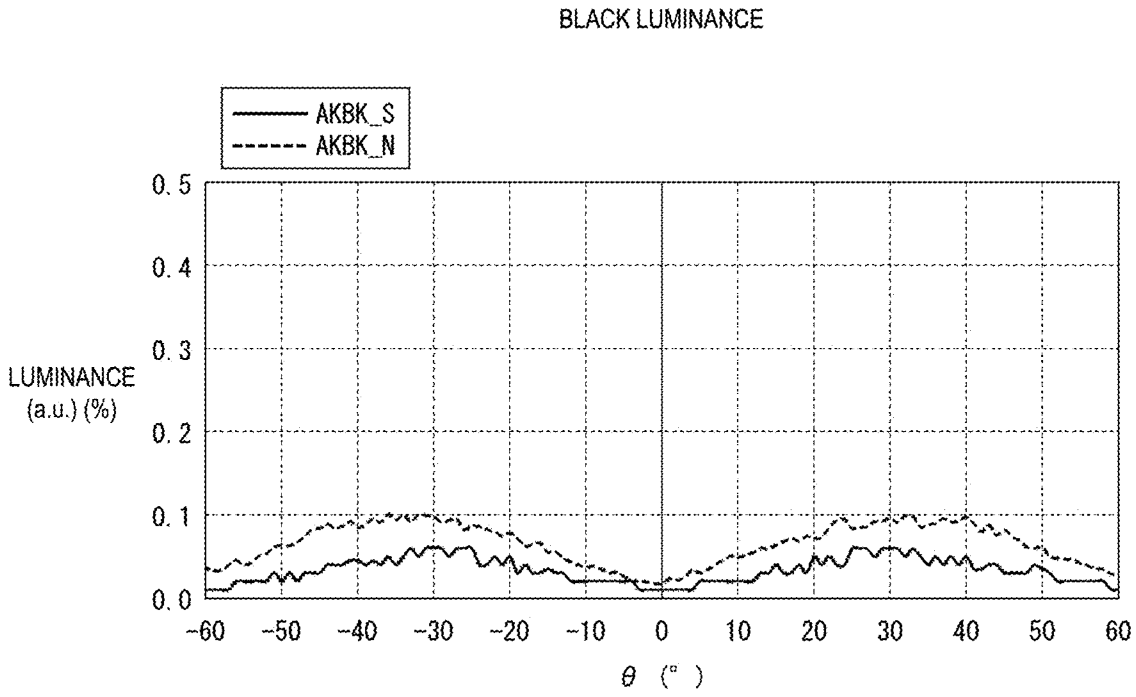
FIG. 16 shows examples of black luminance in the reference embodiment and the first embodiment.

FIG. 16 shows examples of black luminance (luminance when a black display image is displayed) in the reference embodiment and the first embodiment. As shown in FIG. 16, in the case of "_S", the minimum value of black luminance is smaller than in the case of "_N". This also indicates that according to the method of the first embodiment, the light leakage at the time of dual-view display can be effectively reduced as compared with the related art.

Next, the inventors determined that XTA which is the crosstalk index value on the first side and XTB which is the crosstalk index value on the second side in the reference embodiment are as follows.

$$XTA=(AKBW-AKBK)/AKBK \quad (2A)$$

$$XTB=(AWBK-AKBK)/AKBK \quad (2B).$$

Furthermore, the inventors determined that XTA_S which is the crosstalk index value on the first side and XTB_S which is the crosstalk index value on the second side in the first embodiment are as follows.

$$XTA\_S=(AKBW\_S-AKBK\_S)/AKBK\_S \quad (3A)$$

$$XTB\_S=(AWBK\_S-AKBK\_S)/AKBK\_S \quad (3B).$$

Figure 17:
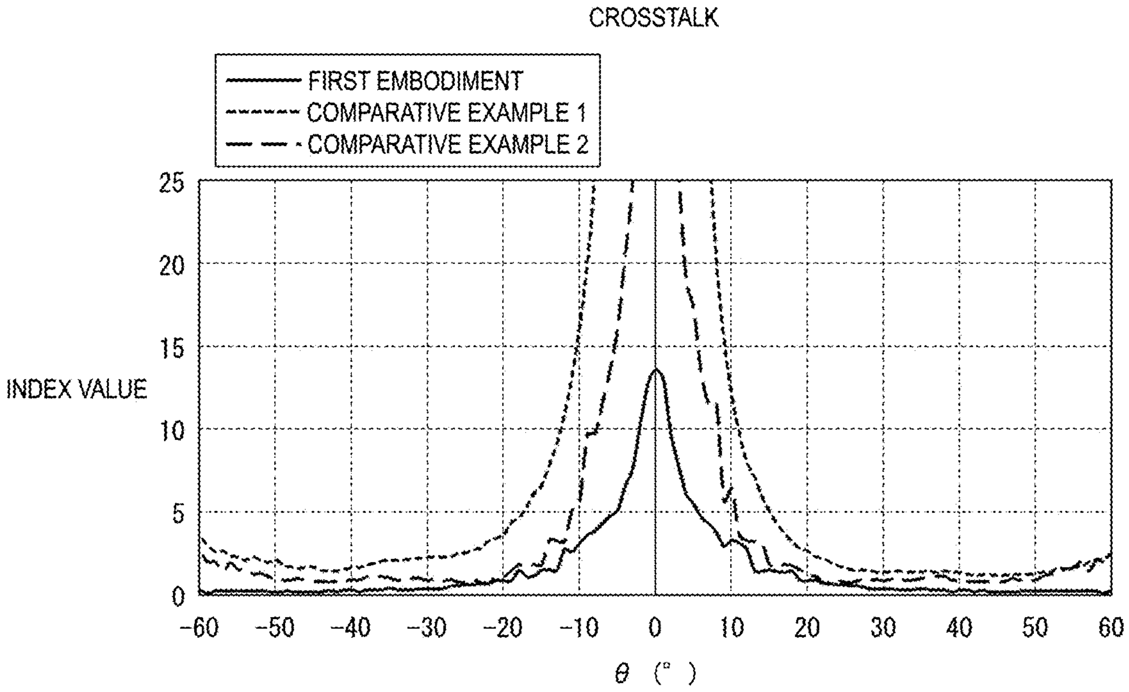
FIG. 17 shows examples of crosstalk index values in the reference embodiment and the first embodiment.

FIG. 17 shows examples of crosstalk index values in the reference embodiment and the first embodiment. The legend "First Embodiment" in FIG. 17 indicates the crosstalk index value in the first embodiment. The legend "Comparative Example 1" indicates the crosstalk index value on the first side in the reference embodiment when the BL of "_N" is used. The legend "Comparative Example 2" indicates the crosstalk index value in the reference embodiment when the BL having light directivity is used.

In the example of FIG. 17, the crosstalk index value at θ<0° represents the crosstalk index value on the first side. Specifically, the crosstalk index value on the first side in Comparative Examples 1 and 2 represents the above-described XTA. On the other hand, the crosstalk index value on the first side in the first embodiment represents XTA_S described above.

In the example of FIG. 17, the crosstalk index value at θ>0° represents the crosstalk index value on the second side. Specifically, the crosstalk index value on the second side in Comparative Examples 1 and 2 represents the above-described XTB. On the other hand, the crosstalk index value on the second side in the first embodiment represents XTB_S described above.

As shown in FIG. 17, according to the method of the first embodiment, the crosstalk index value can be effectively reduced as compared with the reference embodiment. This also indicates that according to the method of the first embodiment, the light leakage at the time of dual-view display can be effectively reduced as compared with the related art. As described above, according to the method of the first embodiment, the fact that the display quality of the multi-view display device can be improved as compared with the related art is supported by the quantitative evaluation result.

Supplement

Figure 18:
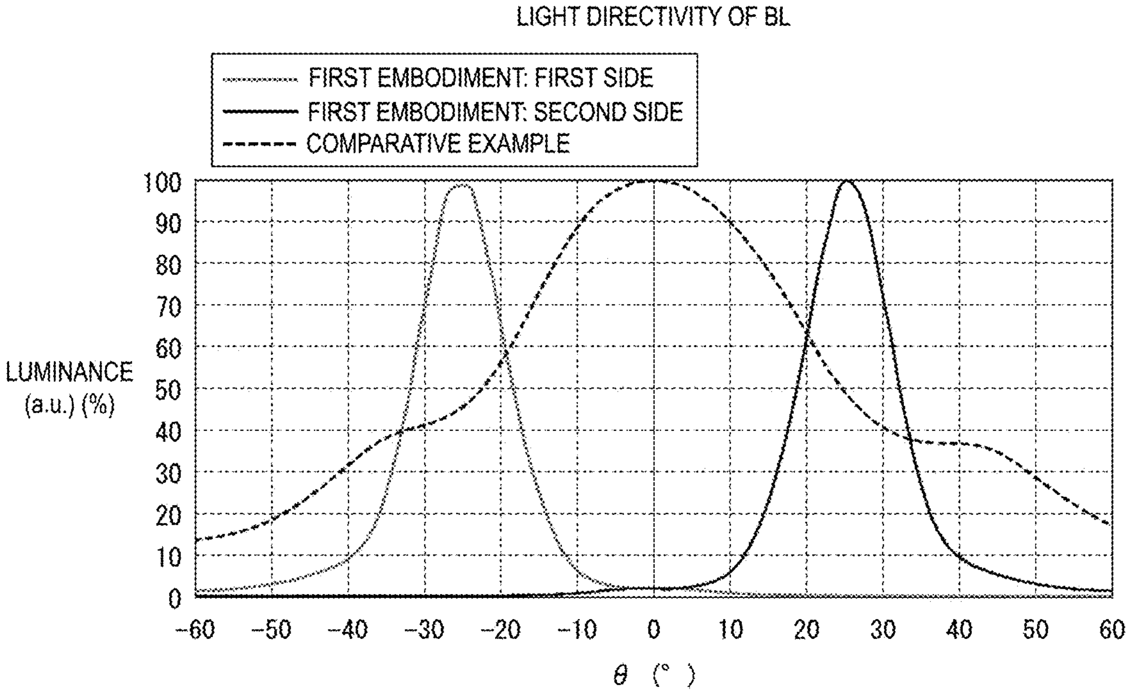
FIG. 18 shows examples of light directivity of a BL.

FIG. 18 shows examples of the light directivity of the BL in the above-described quantitative evaluation. The legend "First Embodiment: first side" in FIG. 18 indicates the light directivity of the first side when the method of the first embodiment is adopted. The legend "First Embodiment: second side" indicates the light directivity of the second side when the method is adopted. The legend "Comparative Example" indicates the light directivity of the BL of "_N". As can be understood from FIG. 18, the above-described luminance in the display device is affected by the light directivity of the BL.

As described above, under the control of the BL control unit 22P, the BL 32P in the first embodiment emits only the first illumination light 90A in the first period and emits only the second illumination light 90B in the second period. Therefore, the BL 32P in the first embodiment is an example of a scanning BL. On the other hand, the BL 32 in the reference embodiment emits uniform illumination light 80. Therefore, the BL 32 in the reference embodiment is an example of a flushing BL.

Second Embodiment

Figure 19:
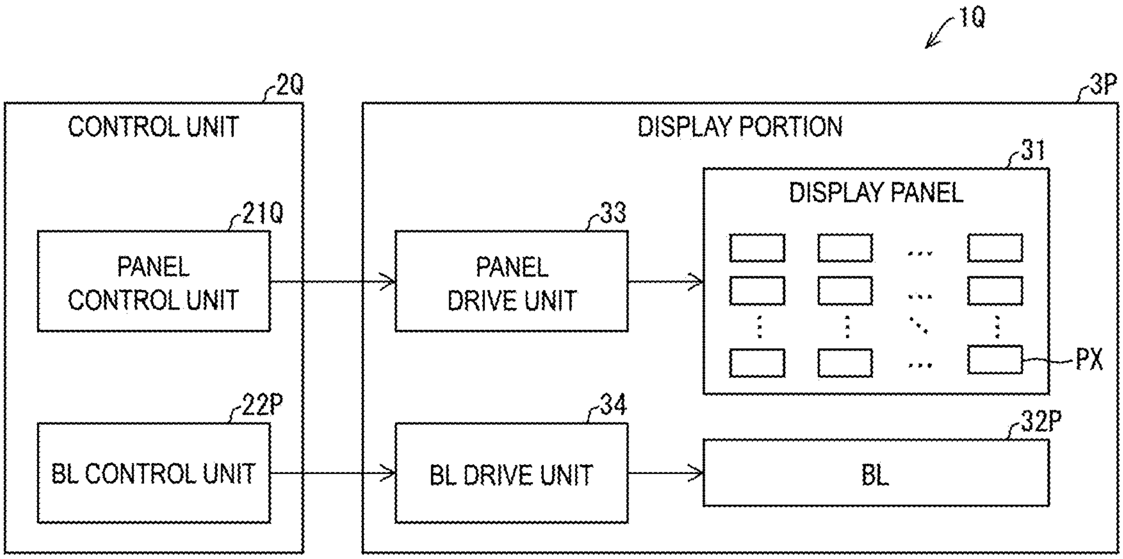
FIG. 19 is a block diagram illustrating a configuration example of a display device of a second embodiment.

FIG. 19 is a block diagram illustrating a configuration example of a display device 1Q of a second embodiment. The display device 1Q includes a control unit 2Q instead of the control unit 2P. The control unit 2Q includes a panel control unit 21Q instead of the panel control unit 21P. The control unit 2Q can perform each process similar to that of the control unit 2P. Therefore, effects similar to those of the display device 1P can also be obtained by the display device 1Q.

First Example

Figure 20:
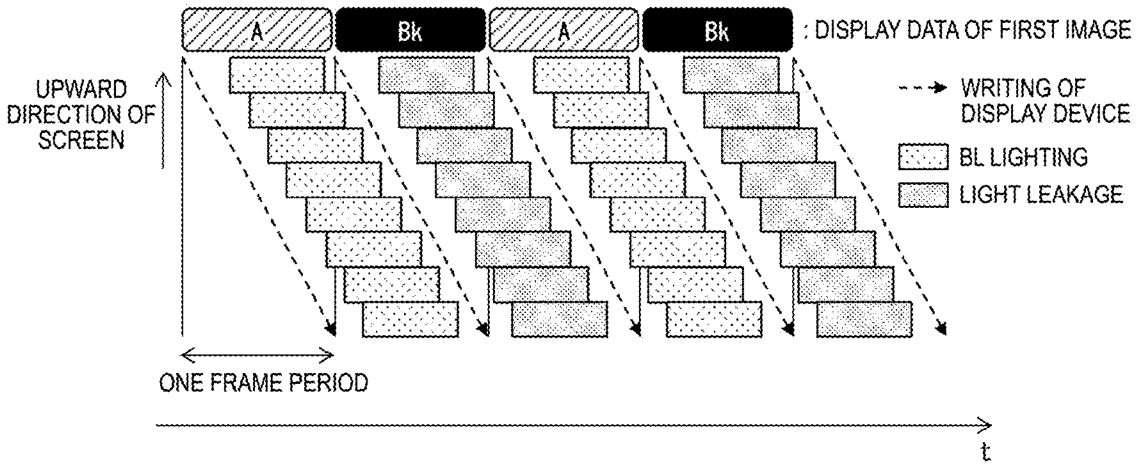
FIG. 20 schematically illustrates a driving example of a display portion by a control unit of the second embodiment.

In the first example, display of the first image will be mainly described. FIG. 20 schematically illustrates a driving example of the display portion 3P by the control unit 2Q. FIG. 20 illustrates a driving example related to the display of the first image. In FIG. 20, display data of the first image is exemplified. In the first example, it is assumed that the second image is a black display image for the sake of simplicity of description.

In the example of FIG. 20, the display data of the first image is generated by inserting black display data into input data of the first image. In the second embodiment, it is assumed that the display data of the first image is prepared in advance. The notation "A" in FIG. 20 represents a portion derived from the input data of the first image in the display data of the first image. As described in the first embodiment, the control unit 2Q controls the display portion 3P so as to display the first image in the first display mode. Therefore, "A" in the example of FIG. 20 is associated with the first period.

On the other hand, the notation "Bk" in FIG. 20 represents the black display data in the display data of the first image. As described in the first embodiment, the control unit 2Q controls the display portion 3P so as not to display the first image in the second display mode. Therefore, "Bk" in the example of FIG. 20 is associated with the second period. In the example of FIG. 20, it is assumed that the length of the first period and the length of the second period are each equal to a predetermined frame period. In the second embodiment, the display data of the first image is generated by inserting the black display data between adjacent frames of the input data of the first image.

In the example of FIG. 20, it is assumed that the display data of the first image is written from the upper side to the lower side in the row direction of the display panel 31. Therefore, in the example of FIG. 20, the timing at which the emission of the first illumination light from the BL 32P to a certain row of the display panel 31 is started varies depending on the position of the row of the display panel 31. In the example of FIG. 20, the timing at which the emission of the first illumination light is started is further delayed toward the lower side of the display panel 31 in the row direction.

As described in the first embodiment, in the second display mode, the second illumination light is emitted from the BL 32P. Therefore, in the period corresponding to "Bk" in FIG. 20, light leakage in which part of the second illumination light leaks to the first side may occur. The light leakage is also illustrated in FIG. 20.

In the example of FIG. 20, from the viewpoint of reducing the influence of light leakage, the light emission period of the BL 32P corresponding to each row is set to be slightly shorter than the frame period. However, when it is not necessary to consider the influence of light leakage, the light emission period of the BL 32P corresponding to each row may be set to be equal to the frame period.

In the second embodiment, the control unit 2Q may control the BL 32P to stop emission of at least part of the second illumination light in the first display mode. Similarly, the control unit 2Q may control the BL 32P to stop emission of at least part of the first illumination light in the second display mode.

Figure 21:
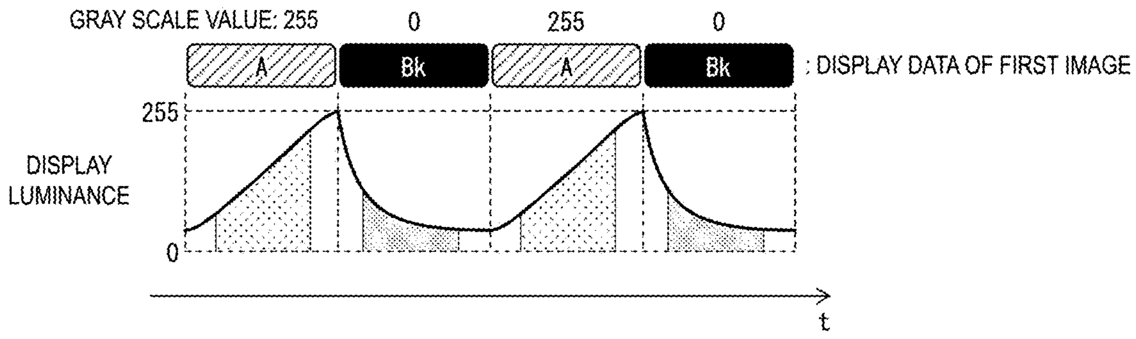
FIG. 21 illustrates an example of a relationship between display data of the first image and a display luminance in a certain row of a display panel.

FIG. 21 illustrates an example of a relationship between the display data of the first image and a display luminance in a certain row of the display panel 31. Specifically, FIG. 21 illustrates an example of a relationship between the display data of the first image and the display luminance in the lowermost row of the display panel 31 in the example of FIG. 20. However, when it is not necessary to consider the influence of light leakage, the relationship between the display data of the first image and the display luminance in FIG. 21 applies to any row of the display panel 31.

In the second embodiment, it is assumed that the gray scale value and the display luminance of the image are given as 8-bit integer values. In the example of FIG. 21, the minimum value and the maximum value of the gray scale value and the display luminance of the image are 0 and 255, respectively.

FIG. 21 illustrates a case in which the first image is a white display image. Therefore, in the example of FIG. 21, the gray scale value of each pixel of the first image is the maximum value 255. On the other hand, the gray scale value of each pixel of the black display data is the minimum value 0.

FIG. 21 schematically shows a temporal transition of the display luminance corresponding to the display data of the first image. The panel control unit 21Q determines the light transmittance in the lowermost row of the display panel 31 in accordance with the display data of the first image, whereby the display luminance in the example of FIG. 21 is obtained.

As known to those skilled in the art, the temporal change of the light transmittance of the display panel 31 depends on a time constant determined by the characteristics of the display panel 31. The display luminance is given as the product of (i) the light transmittance obtained according to the response characteristics of the display panel 31 and (ii) the BL light emission luminance. For this reason, for example, depending on whether the flushing BL or the scanning BL is used as the BL of the display device, the mode of the temporal change of the display luminance may be different.

When the display panel 31 is driven by alternately arranging the gray scale value of the first image (before conversion) and the gray scale value 0, the waveform indicating the mode of the temporal change of the display luminance of the first image does not become a rectangular waveform. The waveform is, for example, a waveform shown in FIG. 21. Therefore, even when the first illumination light is emitted, the display luminance intended to be displayed in accordance with the gray scale value of the first image cannot be achieved. In addition, the first position is also affected by light leakage of the second illumination light.

Therefore, the panel control unit 21Q may convert the gray scale value of the first image such that the luminance obtained by multiplying the light transmittance of the display panel 31 achieved by repetition of the gray scale value of the first image and the gray scale value of black (e.g., gray scale value 0) by (i) the light amount of the first illumination light when observed from the first position and (ii) the light amount of the second illumination light as the leakage light to the first position when observed from the first position becomes a predetermined (desired) luminance for the first image.

As can be understood from the above description, the panel control unit 21Q may convert the gray scale value of the first image based on the light transmittance of the display panel 31 achieved by repetition of the gray scale value of the first image and the gray scale value of black, (i) the light amount of the first illumination light when observed from the first position, and (ii) the light amount of the second illumination light as the leakage light to the first position when observed from the first position.

For example, the predetermined display luminance for the first image is given as the sum of (i) the product of the light transmittance of the display panel 31 achieved by repetition of the gray scale value of the first image and the gray scale value of black and the luminance of the first illumination light when observed from the first position in the first period and (ii) the product of the light transmittance and the luminance of the second illumination light as the leakage light to the first position when observed from the first position in the second period. Therefore, the panel control unit 21Q may determine the gray scale value of the first image after conversion based on the sum.

For example, data indicating a correspondence relationship between the gray scale value of the first image before conversion (the gray scale value of the input data of the first image) and the gray scale value of the first image after conversion may be prepared in advance. In the second embodiment, a case in which a first table indicating the correspondence relationship is prepared in advance will be exemplified. In this case, the panel control unit 21Q can use the first table to determine the gray scale value of the first image after conversion corresponding to the gray scale value of the first image before conversion. Thus, desired display luminance of the first image in the first display mode can be achieved.

FIG. 22 shows an example of the first table. In the example of FIG. 22, the gray scale value of the first image before conversion and the gray scale value of the first image after conversion corresponding to the gray scale value are shown. The first table may be used as a look-up table (LUT) for deriving the gray scale value of the first image after conversion from the gray scale value of the first image before conversion. The first table may be created based on a result of an experiment in which display in the first display mode is performed.

Figure 23:
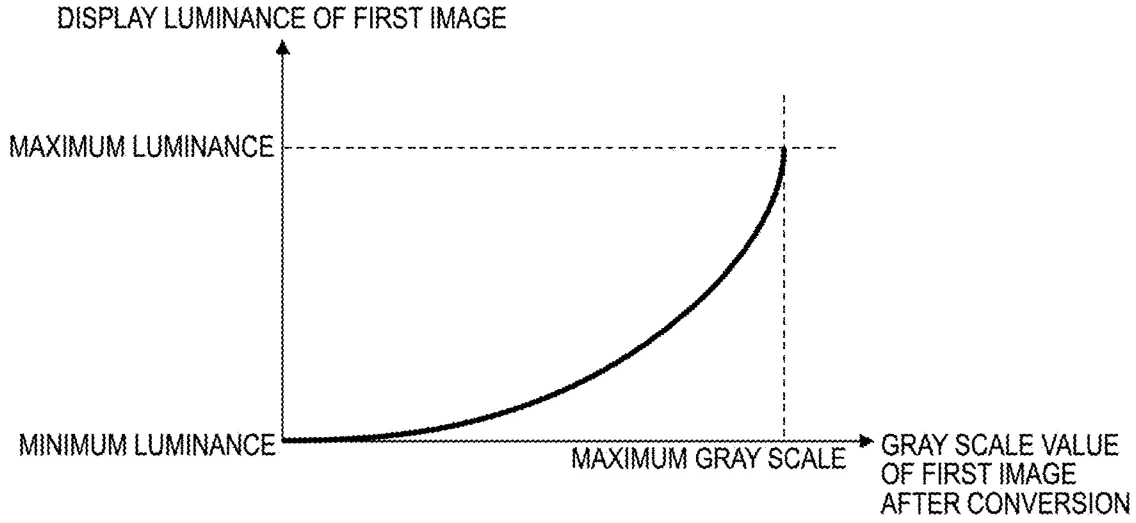
FIG. 23 illustrates an example of a graph showing a correspondence relationship between the gray scale value of the first image after conversion and the display luminance of the first image.

FIG. 23 illustrates an example of a graph showing a correspondence relationship between the gray scale value of the first image after conversion and the display luminance of the first image. As an example, the graph of FIG. 23 shows a gamma curve having a predetermined gamma value (e.g., gamma value 2.2).

The above explanations for the first image also apply to the second image. Therefore, for example, in the second embodiment, it is assumed that display data of the second image is also prepared in advance. In the second embodiment, the display data of the second image is generated by inserting the black display data between adjacent frames of input data of the second image.

When the display panel 31 is driven by alternately arranging the gray scale value of the second image (before conversion) and the gray scale value 0, the waveform indicating the mode of the temporal change of the display luminance of the second image does not become a rectangular waveform. Therefore, even when the second illumination light is emitted, the display luminance intended to be displayed in accordance with the gray scale value of the second image cannot be achieved. In addition, the second position is also affected by light leakage of the first illumination light.

Therefore, the panel control unit 21Q may convert the gray scale value of the second image such that the luminance obtained by multiplying the light transmittance of the display panel 31 achieved by repetition of the gray scale value of the second image and the gray scale value of black (e.g., gray scale value 0) by (i) the light amount of the second illumination light observed from the second position and (ii) the light amount of the first illumination light as leakage light to the second position observed from the second position becomes a predetermined (desired) luminance for the second image.

As can be understood from the above description, the panel control unit 21Q may convert the gray scale value of the second image based on the light transmittance of the display panel 31 achieved by repetition of the gray scale value of the second image and the gray scale value of black, (i) the light amount of the second illumination light when observed from the second position, and (ii) the light amount of the first illumination light as the leakage light to the second position when observed from the second position.

For example, the predetermined display luminance for the second image is given as the sum of (i) the product of the light transmittance of the display panel 31 achieved by repetition of the gray scale value of the second image and the gray scale value of black and the luminance of the second illumination light when observed from the second position in the second period and (ii) the product of the light transmittance and the luminance of the first illumination light as the leakage light to the second position when observed from the second position in the first period. Therefore, the panel control unit 21Q may determine the gray scale value of the second image after conversion based on the sum.

Data indicating a correspondence relationship between the gray scale value of the second image before conversion (the gray scale value of the input data of the second image) and the gray scale value of the second image after conversion may be prepared in advance. In the second embodiment, a case in which a second table indicating the correspondence relationship is prepared in advance will be exemplified. In this case, the panel control unit 21Q can use the second table to determine the gray scale value of the second image after conversion corresponding to the gray scale value of the second image before conversion. Thus, desired display luminance of the second image in the second display mode can be achieved. The second table may be created based on a result of an experiment in which display in the second display mode is performed.

As described above, according to the second embodiment, the first image can be converted in consideration of the response characteristics of the display panel 31 and the type of the BL. Then, the converted first image can be displayed. In addition, according to the second embodiment, the second image can also be converted in consideration of the response characteristics of the display panel 31 and the type of the BL. Then, the converted second image can also be displayed. Therefore, it is possible to improve the display quality of the multi-view display device as compared with the related art.

For example, according to the second embodiment, it is not always necessary to design the hardware of the display device so as to obtain a fast response characteristic in the display panel 31. As a result, for example, a higher frame rate may be allowed. Adopting a higher frame rate is beneficial to reduce flickers.

Second Example

Figure 24:
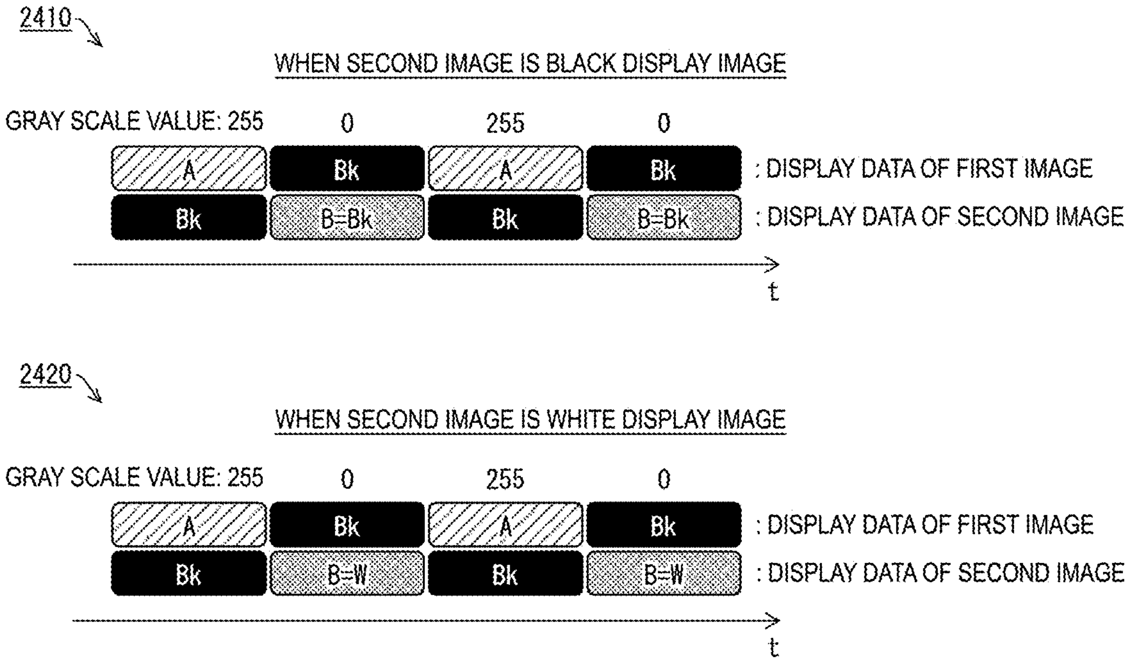
FIG. 24 illustrates an example of display data of each of the first image and the second image in a certain row of the display panel.

FIG. 24 illustrates an example of display data of each of the first image and the second image in a certain row of the display panel 31 (e.g., a certain row of the display panel 31). The display data of the first image in FIG. 24 is equivalent to the example in FIG. 21. Unlike FIG. 21, FIG. 24 further illustrates the display data of the second image.

A reference numeral 2410 in FIG. 24 indicates display data of the second image in a case in which the second image is a black display image. On the other hand, a reference numeral 2420 indicates display data of the second image in a case in which the second image is a white display image. The notation "W" in FIG. 24 represents white display data in the display data of the second image.

Figure 25:
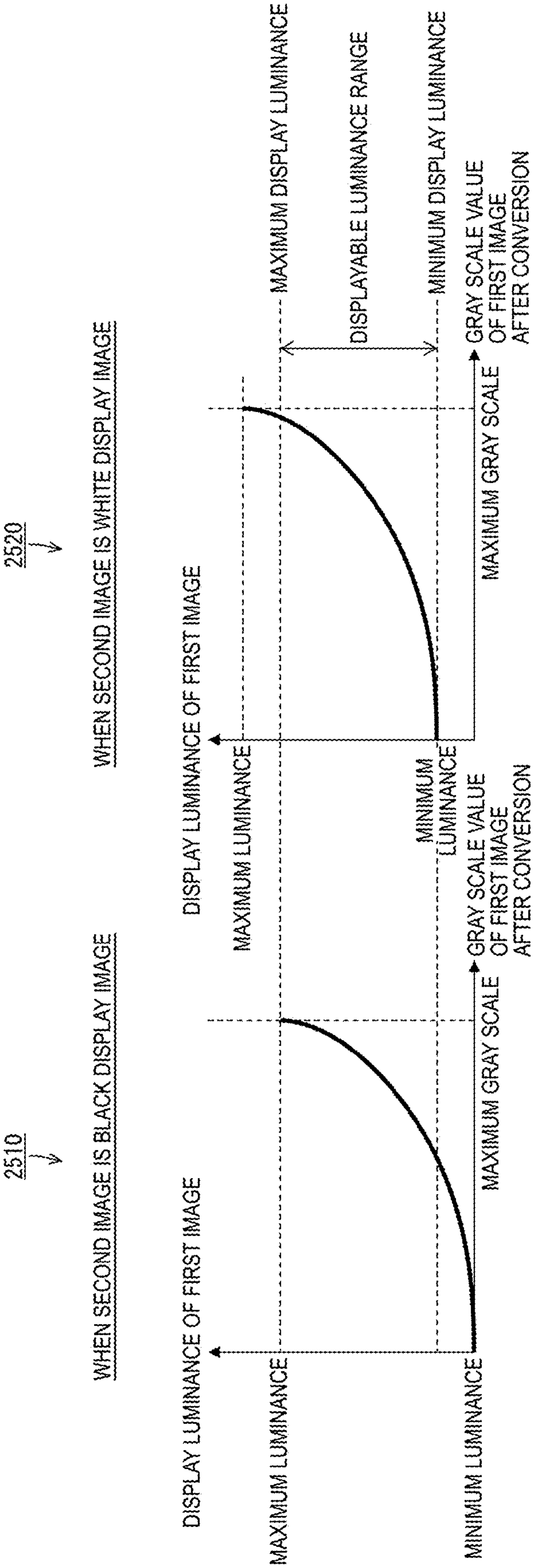
FIG. 25 illustrates an example of a graph showing a correspondence relationship between the gray scale value of the first image after conversion and the display luminance of the first image, which corresponds to the example of FIG. 24.

FIG. 25 illustrates an example of a graph showing a correspondence relationship between the gray scale value of the first image after conversion and the display luminance of the first image, which corresponds to the example of FIG. 24. A reference numeral 2510 in FIG. 25 corresponds to the reference numeral 2410 in FIG. 24. The reference numeral 2510 in FIG. 25 illustrates an example of a graph showing the correspondence relationship between the gray scale value of the first image after conversion and the display luminance of the first image in the case in which the second image is a black display image. The graph indicated by the reference numeral 2510 is equivalent to the graph in the example of FIG. 23.

A reference numeral 2520 in FIG. 25 corresponds to the reference numeral 2420 in FIG. 24. The reference numeral 2520 in FIG. 25 illustrates an example of a graph illustrating the correspondence relationship between the gray scale value of the first image after conversion and the display luminance of the first image in a case in which the second image is a white display image. As the gray scale value of each pixel of the second image increases, the influence of light leakage from the second side to the first side increases. Therefore, the crosstalk from the second side to the first side may become remarkable as the gray scale value of each pixel of the second image increases.

As described above, the minimum luminance in the example of the reference numeral 2520 is greater than the minimum luminance in the example of the reference numeral 2510. Similarly, the maximum luminance in the example of the reference numeral 2520 is greater than the maximum luminance in the example of the reference numeral 2510. In the example of the reference numeral 2520, the maximum luminance is greater than that in the example of the reference numeral 2510. In FIG. 25, the graph of the reference numeral 2520 is exemplified as a graph obtained by shifting the graph of the reference numeral 2510 in the positive direction of the vertical axis.

It is expected that the display quality can be further improved by considering the characteristic that the influence of the light leakage from the second side to the first side increases as the gray scale value of each pixel of the second image increases. Thus, as an example, a displayable luminance range of the first image may be set from a predetermined minimum display luminance to a predetermined maximum display luminance.

In the example of FIG. 25, the minimum display luminance is set as the minimum luminance of the first image in the example of the reference numeral 2520. That is, the minimum display luminance is set as the minimum luminance of the first image when the second image is a white display image. On the other hand, the maximum display luminance is set as the maximum luminance of the first image in the example of the reference numeral 2510. In other words, the maximum display luminance is set as the maximum luminance of the first image when the second image is a black display image.

Also in the second example, the first table may be created based on a result of an experiment in which display in the first display mode is performed. The second table may be created based on a result of an experiment in which display in the second display mode is performed.

Example of Implementation with Software

Functions of the display devices 1 to 10 (hereinafter referred to as "device") can be achieved by a program for causing a computer to function as each control block (in particular, each unit included in the control units 2 to 2Q) of the device.

In this case, the device includes a computer including at least one control device (for example, a processor) and at least one storage device (for example, a memory), as hardware for executing the program. By executing the program by using the control device and the storage device, each function described in the above-described each embodiment is achieved.

The program may be stored in a non-transitory and computer readable one or a plurality of recording media. The device described above may include or may not include the recording medium. In the latter case, the program may be supplied to the device via any wired or wireless transmission medium.

Furthermore, some or all of the functions of each of the control blocks can be achieved by a logic circuit. For example, an integrated circuit, in which a logic circuit functioning as each of the control blocks described above is formed, is also included within the scope of an aspect of the disclosure. In addition, it is also possible to implement the function of each of the control blocks described above by, for example, quantum computers.

In addition, each process described in the above-described each embodiment may be executed by artificial intelligence (AI). In this case, the AI may be operated by the control device, or may be operated by another device (for example, an edge computer or a cloud server).

Supplement

A display device according to a first aspect of the disclosure is a display device configured to present a first image to a first user located at a first position with respect to a display surface and present a second image different from the first image to a second user located at a second position different from the first position, the display device including: a display panel including a first display pixel group that contributes to formation of the first image on the display surface and a second display pixel group that contributes to formation of the second image on the display surface; a backlight configured to emit illumination light toward the first display pixel group and the second display pixel group; a barrier configured to prevent part of first light, which is light obtained by wavelength conversion of the illumination light by the first display pixel group, and part of second light, which is light obtained by wavelength conversion of the illumination light by the second display pixel group, from traveling toward the display surface; and a control unit configured to control the display panel and the backlight, in which, in a first display mode, the control unit controls the display panel to minimize a light transmittance of the display panel at a position corresponding to the second display pixel group, and controls the backlight to stop emission of at least part of second illumination light that is the illumination light having directivity to the second position, in a second display mode different from the first display mode, the control unit controls the display panel to minimize a light transmittance of the display panel at a position corresponding to the first display pixel group, and controls the backlight to stop emission of at least part of first illumination light that is the illumination light having directivity to the first position, the control unit alternately switches between the first display mode and the second display mode, calls a period in which the first image is displayed in the first display mode as a first period, and calls a period in which the second image is displayed in the second display mode as a second period, and the control unit converts a gray scale value of the first image based on a light transmittance of the display panel achieved by repetition of a gray scale value of the first image and a gray scale value of black, (i) a light amount of the first illumination light when observed from the first position, and (ii) a light amount of the second illumination light as leakage light to the first position when observed from the first position.

In a display device according to a second aspect of the disclosure, in the first aspect, the control unit may determine a gray scale value of a converted first image based on a sum of (i) a product of a light transmittance of the display panel achieved by repetition of a gray scale value of the first image and a gray scale value of black and a luminance of the first illumination light when observed from the first position in the first period and (ii) a product of the light transmittance and a luminance of the second illumination light as leakage light to the first position when observed from the first position in the second period.

In a display device according to a third aspect of the disclosure, in the first or second aspect, the control unit may convert a gray scale value of the second image based on a light transmittance of the display panel achieved by repetition of a gray scale value of the second image and a gray scale value of black, (i) a light amount of the second illumination light when observed from the second position, and (ii) a light amount of the first illumination light as leakage light to the second position when observed from the second position.

In a display device according to a fourth aspect of the disclosure, in the third aspect, the control unit may determine a gray scale value of a converted second image based on a sum of (i) a product of a light transmittance of the display panel achieved by repetition of a gray scale value of the second image and a gray scale value of black and a luminance of the second illumination light when observed from the second position in the second period and (ii) a product of the light transmittance and a luminance of the first illumination light as leakage light to the second position when observed from the second position in the first period.

In a display device according to a fifth aspect of the disclosure, in any one of the first to fourth aspects, the control unit may alternately switch the first display mode and the second display mode at a frequency equal to or higher than 120 Hz.

In a display device according to a sixth aspect of the disclosure, in any one of the first to fifth aspects, the backlight may include a light guiding mechanism that generates the first illumination light and the second illumination light.

In a display device according to a seventh aspect of the disclosure, in any one of the first to sixth aspects, an opening may be formed in the barrier, part of the first light having directivity to the first position may pass through the opening and travel toward the display surface in the first display mode, and part of the second light having directivity to the second position may pass through the opening and travel toward the display surface in the second display mode.

In a display device according to an eighth aspect of the disclosure, in any one of the first to seventh aspects, the first display pixel group and the second display pixel group may be alternately positioned in the display panel when observed along a direction from the first position toward the second position.

In a display device according to a ninth aspect of the disclosure, in any one of the first to eighth aspects, the first position may be a position on a left side of the display surface, and the second position may be a position on a right side of the display surface.

In a display device according to a tenth aspect of the disclosure, in any one of the first to ninth aspects, the display panel may be a liquid crystal display panel.

APPENDIX

An aspect of the disclosure is not limited to the embodiments described above, and various modifications may be made within the scope of the claims. Embodiments obtained by appropriately combining technical approaches disclosed in the different embodiments also fall within the technical scope of the aspect of the disclosure. Moreover, novel technical features can be formed by combining the technical approaches disclosed in each of the embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device configured to present a first image to a first user located at a first position with respect to a display surface and present a second image different from the first image to a second user located at a second position different from the first position, the display device comprising:

a display panel including a first display pixel group that contributes to formation of the first image on the display surface and a second display pixel group that contributes to formation of the second image on the display surface;

a backlight configured to emit illumination light toward the first display pixel group and the second display pixel group;

a barrier configured to prevent part of first light, which is light obtained by wavelength conversion of the illumination light by the first display pixel group, and part of second light, which is light obtained by wavelength conversion of the illumination light by the second display pixel group, from traveling toward the display surface; and a control unit configured to control the display panel and the backlight, wherein, in a first display mode, the control unit controls the display panel to minimize a light transmittance of the display panel at a position corresponding to the second display pixel group, and controls the backlight to stop emission of at least part of second illumination light that is the illumination light having directivity to the second position, in a second display mode different from the first display mode, the control unit controls the display panel to minimize a light transmittance of the display panel at a position corresponding to the first display pixel group, and controls the backlight to stop emission of at least part of first illumination light that is the illumination light having directivity to the first position, the control unit alternately switches between the first display mode and the second display mode, calls a period in which the first image is displayed in the first display mode as a first period, and calls a period in which the second image is displayed in the second display mode as a second period, and the control unit converts a gray scale value of the first image based on a light transmittance of the display panel achieved by repetition of a gray scale value of the first image and a gray scale value of black, (i) a light amount of the first illumination light when observed from the first position, and (ii) a light amount of the second illumination light as leakage light to the first position when observed from the first position.

2. The display device according to claim 1, wherein the control unit determines a gray scale value of a converted first image based on a sum of (i) a product of a light transmittance of the display panel achieved by repetition of a gray scale value of the first image and a gray scale value of black and a luminance of the first illumination light when observed from the first position in the first period and (ii) a product of the light transmittance and a luminance of the second illumination light as leakage light to the first position when observed from the first position in the second period.

3. The display device according to claim 1, wherein the control unit converts a gray scale value of the second image based on a light transmittance of the display panel achieved by repetition of a gray scale value of the second image and a gray scale value of black, (i) a light amount of the second illumination light when observed from the second position, and (ii) a light amount of the first illumination light as leakage light to the second position when observed from the second position.

4. The display device according to claim 3, wherein the control unit determines a gray scale value of a converted second image based on a sum of (i) a product of a light transmittance of the display panel achieved by repetition of a gray scale value of the second image and a gray scale value of black and a luminance of the second illumination light when observed from the second position in the second period and (ii) a product of the light transmittance and a luminance of the first illumination light as leakage light to the second position when observed from the second position in the first period.

5. The display device according to claim 1, wherein the control unit alternately switches between the first display mode and the second display mode at a frequency equal to or higher than 120 Hz.

6. The display device according to claim 1, wherein the backlight includes a light guiding mechanism that generates the first illumination light and the second illumination light.

7. The display device according to claim 1, wherein an opening is formed in the barrier, in the first display mode, part of the first light having directivity to the first position passes through the opening and travels toward the display surface, and in the second display mode, part of the second light having directivity to the second position passes through the opening and travels toward the display surface.

8. The display device according to claim 1, wherein the first display pixel group and the second display pixel group are alternately positioned in the display panel when observed along a direction from the first position toward the second position.

9. The display device according to claim 1, wherein the first position is a position on a left side of the display surface, and the second position is a position on a right side of the display surface.

10. The display device according to claim 1, wherein the display panel is a liquid crystal display panel.

* * * * *